(12) United States Patent
Bory et al.

(10) Patent No.: US 11,371,677 B2
(45) Date of Patent: Jun. 28, 2022

(54) OPTOMECHANICAL SYSTEM AND METHOD FOR CONTROLLING THE PHOTOMETRIC DISTRIBUTION OF LUMINAIRES AND CORRESPONDING LUMINAIRES

(71) Applicant: Insolight SA, Lausanne (CH)

(72) Inventors: Noé Bory, Lausanne (CH); Florian Gerlich, Lausanne (CH); Laurent Coulot, Lausanne (CH); Mathieu Ackermann, Lausanne (CH)

(73) Assignee: INSOLIGHT SA, Lausanne (CH)

( * ) Notice: Subject to any disclaimer, the term of this patent is extended or adjusted under 35 U.S.C. 154(b) by 24 days.

(21) Appl. No.: 17/048,876

(22) PCT Filed: Apr. 16, 2019

(86) PCT No.: PCT/EP2019/059778
§ 371 (c)(1),
(2) Date: Oct. 19, 2020

(87) PCT Pub. No.: WO2019/201902
PCT Pub. Date: Oct. 24, 2019

(65) Prior Publication Data
US 2021/0348740 A1    Nov. 11, 2021

(30) Foreign Application Priority Data
Apr. 20, 2018   (EP) .................................... 18168557

(51) Int. Cl.
*F21V 14/06*      (2006.01)
*F21V 14/04*      (2006.01)
(Continued)

(52) U.S. Cl.
CPC ................ *F21V 14/06* (2013.01); *F21K 9/65* (2016.08); *F21V 5/007* (2013.01); *F21V 14/04* (2013.01);
(Continued)

(58) Field of Classification Search
CPC .......... F21V 14/04; F21V 14/06; F21V 17/02; F21V 5/004; F21V 5/007; F21K 9/65
See application file for complete search history.

(56) References Cited

U.S. PATENT DOCUMENTS

2012/0121244 A1   5/2012  Stavely
2017/0175990 A1*  6/2017  Patel ......................... F21S 8/00
(Continued)

FOREIGN PATENT DOCUMENTS

CN    102937258 A    5/2015
DE    10005795 A1    8/2001
(Continued)

OTHER PUBLICATIONS

International Search Report and Written Opinion in PCT/EP2019/059778 dated Aug. 6, 2019 (13 pages).

*Primary Examiner* — Julie A Bannan
(74) *Attorney, Agent, or Firm* — Pearne & Gordon LLP

(57) ABSTRACT

The present invention relates to an optomechanical system (1), for dynamically controlling the photometric distribution of a luminaire, comprising a static frame (10), a light emitting substrate (50) with one or more light emitting elements (51) capable of emitting incident light (80), an optical layer (40) comprising one or more optical elements (41) capable of capturing incident light (80) and transmitting transmitted light (90), and a shifting mechanism (60) for translationally moving along at least one direction a movable element, which is chosen from either the optical layer (40) or the light emitting substrate (50). The shifting mecha- (Continued)

nism (60) comprises further one or more guiding elements (61), capable of maintaining the inclination angle between the light emitting substrate (50) and the optical layer (40) while moving the movable element (40,50). The optomechanical system is configured in such a way that the photometric distribution of the luminaire is dynamically controllable by adjusting the relative positon of the light emitting elements (51) with respect to the optical elements (41). The present invention relates also to luminaires comprising such an optomechanical system (1) and to a related method for adjusting the photometric distribution of luminaires.

20 Claims, 15 Drawing Sheets

(51) Int. Cl.
*F21V 17/02* (2006.01)
*G02B 26/08* (2006.01)
*F21K 9/65* (2016.01)
*F21V 5/00* (2018.01)
*F21Y 105/10* (2016.01)

(52) U.S. Cl.
CPC .......... *F21V 17/02* (2013.01); *G02B 26/0833* (2013.01); *F21Y 2105/10* (2016.08)

(56) References Cited

U.S. PATENT DOCUMENTS

| | | | |
|---|---|---|---|
| 2017/0205051 | A1 | 7/2017 | Jørgensen |
| 2019/0120447 | A1* | 4/2019 | Campetella ............... F21V 5/02 |

FOREIGN PATENT DOCUMENTS

| | | | | |
|---|---|---|---|---|
| DE | 102014207750 A1 | 10/2015 | | |
| EP | 3088799 A1 | 11/2016 | | |
| KR | 101580599 B1 | 12/2015 | | |
| WO | WO-2011027254 A1 * | 3/2011 | ............. | G03B 21/14 |
| WO | 2014164792 A1 | 10/2014 | | |
| WO | 2017194741 A1 | 11/2017 | | |
| WO | 2018058136 A1 | 3/2018 | | |
| WO | 2018104318 A1 | 6/2018 | | |

\* cited by examiner

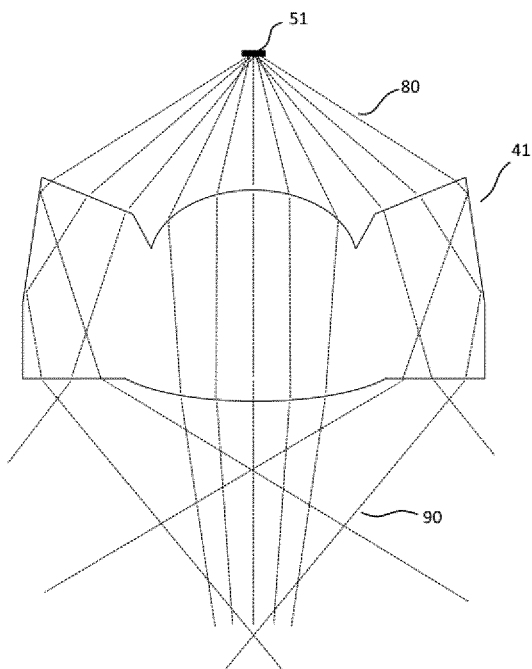
FIG. 11A
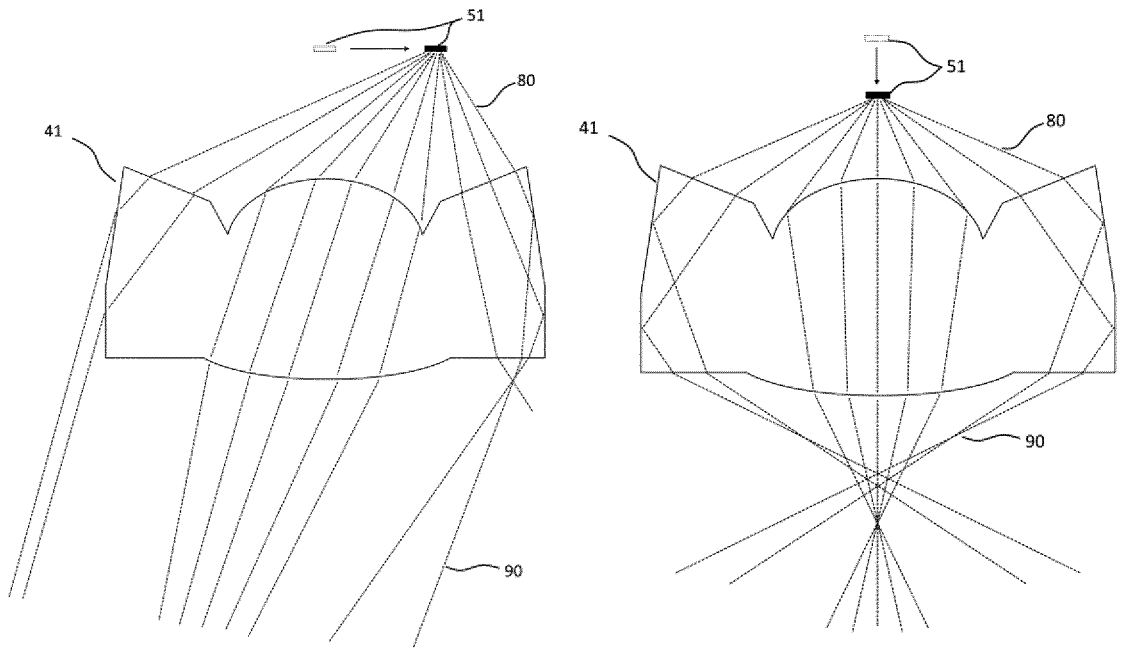
FIG. 11B
FIG. 11C

OPTOMECHANICAL SYSTEM AND METHOD FOR CONTROLLING THE PHOTOMETRIC DISTRIBUTION OF LUMINAIRES AND CORRESPONDING LUMINAIRES

TECHNICAL FIELD OF THE INVENTION

The present invention relates to the technical field of optical systems, more specifically to the technical field of optomechanical systems. In particular, the present invention relates to an optomechanical system for controlling the photometric distribution of luminaires and the corresponding method, in particular for controlling the photometric distribution of luminaires based on light sources such as LEDs. Such optomechanical systems can in particular be used to control the accentuation, the directionality, the tilt angle and other parameters of the light output of luminaires. The present invention relates also to luminaires implementing an optomechanical system or the method according to the present invention.

BACKGROUND OF THE INVENTION

Luminaires have applications in a myriad of different fields. In many of those fields, it is desirable to easily be able to control the light output of the luminaires. For instance, in retail stores it is useful to change the light output of luminaires to highlight and promote specific products to increase sales figures, or to be able to quickly adapt the light distribution when the store configuration is changing, without refurbishment costs. In office rooms it is desirable to be able to adapt the light distribution to environmental lighting conditions (for example changing sun position over days and seasons) or to changes in office configuration (change of desk arrangement, new furniture, etc.). In the field of architecture, luminaires are often used that permit to quickly and easily adapt the illumination of official buildings or monuments for specific events, time of the year or architectural considerations (dynamic city beautification). In the automotive industry, modern cars have headlights adapting direction and distribution to road conditions, traffic, vehicle dynamics and load. In the field of street or road lightning, it is desirable to have luminaires able to adapt the output and inclination based on street/road pattern, width, environmental and traffic conditions. It is also advantageous to have luminaires with adaptable light output to reduce the amount of luminaires required to light up an industrial workspace or a factory by focusing light where it is really required. Finally, in the medical field it is highly advantageous to have luminaires output that can follow the movements of surgeons or dentists during a medical intervention. The parameters describing the light output of a light source or a luminaire, as for example, the light accentuation, directionality or intensity, combine and form the so-called photometric distribution of the luminaire.

In the above-mentioned fields and in many others, light emitting diodes (LEDs) are, due to their energy efficiency and reliability, progressively replacing other type of light sources. LEDs are by nature quasi-punctual sources, which are usually assembled in arrays to form so-called LED-panels, where a plurality of punctual sources are arranged on typically wide and rather planar substrate. Moving or tilting each light source (e.g. each LED) individually to adjust the photometric distribution of such LED-panel is not practical.

Solutions to adjust the photometric distribution of luminaire are known from prior art but involve powerful motorization and complex mechanics. As illustrated in FIG. 1a, adjusting the region of a wall illuminated by a luminaire requires usually the luminaire in its entirety to be tilted. Moving or tilting the entire luminaire is space consuming, requires powerful motorization and complex mechanics, and is not applicable to all use cases (e.g. when the luminaire is recessed in a ceiling). The aim of the present invention is illustrated in FIG. 1b. As shown in this Figure, one goal of the invention is to provide luminaires comprising an optomechanical system which permits to control the photometric distribution of the luminaire without requiring any translation, rotation or tilting of the luminaire in its entirety.

SUMMARY OF THE INVENTION

Thus, the object of the present invention is to propose a novel optomechanical system and a corresponding method for controlling the photometric distribution of luminaires, in which the above-described drawbacks of the known systems and methods are completely overcome or at least greatly diminished. It is also an object of the present invention to propose a novel luminaire comprising such a novel optomechanical system.

An object of the present invention is in particular to propose an optomechanical system and a corresponding method for controlling the photometric distribution without needing to displace the luminaire in its entirety, as well as a luminaire comprising an optomechanical system according to present invention.

Features disclosed herein in different embodiments can be combined easily by a person who is skilled in the art.

In particular, in a first aspect, the objects of the present invention are achieved by an optomechanical system for dynamically controlling the photometric distribution of a luminaire comprising:
  a static frame,
  a light emitting substrate with one or more light emitting elements capable of emitting incident light,
  an optical layer comprising one or more optical elements capable of capturing incident light and transmitting transmitted light,
  a shifting mechanism for translationally moving along at least one direction a movable element which is chosen from either the optical layer or the light emitting substrate,
  wherein the shifting mechanism comprises one or more guiding elements, said one or more guiding elements being capable of maintaining the inclination angle between the light emitting substrate and the optical layer while moving the movable element, and wherein the optomechanical system is configured in such a way that the photometric distribution of the luminaire is dynamically controllable by adjusting the relative position of the light emitting elements with respect to the optical elements.

The optomechanical system according to the present invention present several advantages. It namely allows for controlling the photometric distribution of a luminaire without moving or tilting each light source individually or without moving or tilting the luminaire, which is space consuming and requires powerful motorization and complex mechanics, and is not applicable to all use cases (e.g. when the luminaire is recessed in a ceiling). By translating the optical layer relatively to the light-emitting substrate—or vice-versa—the relative position of each light emitting element and optical element can be adjusted, changing how light emitted by the light emitting element is collected and transmitted by the corresponding optical element. The shape and directionality of the whole luminaire output, i.e. the photometric distribution, can therefore be adjusted with a single shifting mechanism. Moreover, since the weight or inertia of the moving parts is very low, the optomechanical system can move very quickly, which is advantageous for applications requiring fast displacements (such as spotlights for stage lighting).

The optomechanical system according to the present invention has furthermore the following benefits: the system is actuated only in translation (no rotation or tilting of the light emitting elements or optical elements is required) and the strokes are very small, typically in the same order of magnitude as the size of the optical elements, i.e. in the millimetre or centimetre range. Moreover, the movement either of the optical layer of the light emitting substrate is usually not visible to the user, and the whole shifting mechanism can be encapsulated within a planar luminaire format (with thin form-factor and protection against harsh environment).

Additionally, the present invention can be designed to fit into thin luminaire profiles (down to about 25 mm) and a large variety of luminaire form factors (circular, rectangular, etc.) and sizes. More specifically, the optomechanical system of the present invention can be miniaturized to fit into space-constrained environments. The invention does not depend on the number of light emitting elements or optical elements: in some applications such as spot lights, there can be only few or even a single light emitting element and/or optical element, while in different applications such as architectural lighting the invention can comprise large arrays of light emitting elements and optical elements.

An optomechanical system according to the present invention can have many advantages in comparison to systems known from the state of the art in particular in the field of vehicles, for instance cars, buses, trains, airplanes or boats. The optomechanical system can be used in this context not only for headlights but also for interior lighting as for example a reader light. Thanks to its simple and inexpensive configuration an optomechanical system according to the present invention is particularly well appropriate for interior lighting where space is limited; the optomechanical system can easily adopt a recessed configuration and therefore be implemented without restricting space, for instance in a car cockpit.

A particular simple configuration of the optomechanical system according to the present invention comprises a light emitting substrate and an optical layer parallel to each other. Further, a shifting mechanism that preserves the distance between the light emitting substrate and the optical layer while moving the movable element, i.e. the movement of the movable element is only planar, is particularly simple to implement.

Thanks to an optomechanical system according to the present invention, it is also possible to simplify the production lines: a single line, respectively a single optical layer, makes it possible to manufacture a multitude of systems with different photometric distributions. The latter can be adjusted on the line by positioning the light sources towards the optics. This is particularly advantageous for applications in the fields of street lighting, airplane reader lights, cars, boats, buses and many others.

In one preferred embodiment of the present invention, the one or more guiding elements are arranged in such a way that the relative position of the optical layer and the light emitting substrate can accurately be adjusted by shifting elements, while specifically avoiding or minimizing relative rotations between the optical layer and the light emitting substrate. With this, the relative position of the optical elements and the light emitting elements can accurately be selected and maintained constant over the whole surface of the light emitting substrate, in order to precisely be able to adjust the photometric distribution of a luminaire.

In another preferred embodiment of the present invention, at least one of the guiding elements is a flexible guiding element, for instance a spring or a leaf spring. Flexible guiding elements are advantageous for systems requiring high reliability, because they do not involve friction and do not suffer from wear.

In a further preferred embodiment of the present invention, at least two guiding elements and two shifting elements are provided. The shifting elements are arranged to shift the movable element along different directions. With an optomechanical system according to this embodiment, the photometric distribution of the light output of the luminaire can be accurately controlled in any direction.

In yet another embodiment of the present invention, the guiding elements are arranged in a single planar module. This is advantageous since this module can be designed in such a way that it can be machined from a single piece of material to minimize assembly costs and tolerance.

In a further preferred embodiment, the distance between the light emitting substrate and the optical layer is controllable via a mechanical cam system comprising an inner shell and an outer shell, wherein the cam system is attached to the planar guiding module by means of the inner shell, in such a way that a horizontal translation of the outer shell produces a horizontal translation of the optical layer, and a rotation of the outer shell, translates into a vertical translation of the optical layer. By means of the mechanical cam system is particularly easy to control the relative positon of the optical layer and light emitting layer in all three directions. Thus, it possible to fully control the photometric distribution of the emitted light.

In another preferred embodiment, the optical layer or the optical elements comprise some attachment elements, such as pins, in order to create a direct attachment between the optical layer and the leaf spring guiding module.

In another preferred embodiment of the present invention, the shifting mechanism comprises a planar module, one or more shifting elements, one or more position sensors and an electronic board. In this embodiment, the shifting mechanism integrates everything required to be able to precisely shift the optical layer or the light emitting substrate in very compact form. The electronic board comprises means for controlling the shifting elements and for detecting by means of the position sensors the relative position of the optical layer with respect to the light emitting substrate. This embodiment is advantageous when the space dedicated to the guiding and shifting mechanism is limited.

In a further preferred embodiment of the present invention, the flexible guiding elements are integrated in the light emitting substrate. In this embodiment, the light emitting substrate itself can contribute to guide the movement of the light emitting elements relative to the optical elements. This embodiment is advantageous to reduce the number of components, to simplify assembly and reduce costs.

In another preferred embodiment of the present invention, the planar module is integrated into the light emitting substrate and is configured in such a way that the movement of the light emitting elements relative to the optical elements is not constant on the entire surface of the light emitting substrate. This allows for a more flexible control of the photometric distribution of the luminaire.

In a further embodiment of the present invention, two or more shifting elements are disposed in parallel on the same translational axis but at opposite ends of the movable element (optical layer or light emitting substrate), and one or more shifting element is disposed in a direction perpendicular to the first two. This arrangement allows better cancelling any spurious rotation around an axis normal to the light emitting substrate, in order to ensure that there is no relative rotation between the light emitting substrate and the optical layer. Preferably, the attachment points at one or both ends of the actuators (from each actuator to the frame and to the movable element) are single or double universal joints, cardan joints or ball joints, in order to allow the actuators to rotate around the axes perpendicular to their own movement, such as to minimize shear forces on the actuator axis.

In another preferred embodiment of the present invention, the optomechanical system further comprises one or more sliders arranged between the light emitting substrate and the optical layer, and one or more pre-constraining elements. The sliders are attached to the optical layer and sliding on the light emitting substrate, or vice-versa. One or more pre-constraint elements (such as springs or leaf springs) are provided to ensure that the one or more sliders are always in contact with the surface they are sliding on. The surface on which the sliders are sliding can further be arranged with a specific layer or coating to decrease friction forces. This embodiment is advantageous to ensure that the distance between the optical layer and the light emitting substrate is constant and that the optical layer is always parallel to the light emitting substrate.

In yet another preferred embodiment of the present invention, the sliders are integrated into the optical layer. With this it is possible to mould the optical layer and the slider at once.

In a further preferred embodiment of the present invention, optomechanical system further comprises a sliding pad between a slider and the surface it is sliding on. The sliding pads can be advantageous to reduce the friction between the sliders and the surface they are sliding on. Furthermore, the shape of the sliding pads can be designed in such a way that a horizontal movement of the slider induces a vertical displacement, which changes the distance between the optical layer and the light emitting substrate. This embodiment is advantageous for adapting the distance between the optical and the light emitting substrate without requiring an additional shifting element along a direction out-of-plane of the light emitting substrate.

In another preferred embodiment of the present invention, the pre-constraining elements are flexible pre-constraining element, such as leaf springs, arranged between the light emitting substrate and the static frame. This is advantageous to reduce the number of parts by removing the need for additional pre-constraining elements.

In a further preferred embodiment of the present invention, the light emitting substrate is directly attached to the optical layer by means of guiding elements such as double cardan joints, double ball joints or linear guiding rails with carriage elements. This allows for guiding the relative movement of the optical layer and of the light emitting substrate on the surface of a sphere. More specifically, when a shifting element moves the optical layer or the light emitting substrate along an in-plane direction, the resulting movement has both an in-plane as well as an out-of-plane component. This embodiment is advantageous to adapt the distance between the optical layer and the light emitting substrate without requiring an additional shifting element along a direction out-of-plane of the light emitting substrate.

In yet another preferred embodiment of the present invention, the guiding elements are integrated into the optical layer. With this it is possible to mould the optical layer and the guiding elements at once.

In another preferred embodiment of the present invention, the guiding elements directly attaching the light emitting substrate to the optical layer are leaf springs, wires, cables or ropes. In this configuration, instead of being guided on the surface of a sphere, the movement of the movable element is guided on an aspherical curvature (e.g. paraboloid or similar).

In a further preferred embodiment of the present invention, the shifting element is an electro-mechanical actuator, an electro-static actuator, a piezo-electrical actuator, a stick-slip actuator, a pneumatic actuator or a mechanical element for manual displacement.

In another preferred embodiment of the present invention, the shifting element comprises a lead screw that is at least partially positioned in the optical layer.

In a further preferred embodiment of the present invention, the shifting element is a rack/pinion system comprising a rack element and a pinion element, wherein the pinion element can be manually or electromechanically rotated. A pinion rack system permits precise translations and at the same a suppression of any spurious rotation of the light emitting substrate or of the optical layer.

In a further preferred embodiment of the present invention, the rack element is integrated into the optical layer or in the light emitting substrate. With this it is possible to mould the optical layer or the light emitting substrate and the rack element at once.

In another preferred embodiment of the present invention, the one or more light emitting elements are LEDs. LEDs are advantageous for their low energy consumption and the design flexibility they offer. LEDs are furthermore quasi-punctual light sources which is favourable to efficiently and precisely control and adapt the photometric distribution of the luminaire.

In one preferred embodiment of the present invention, the one or more light emitting elements are assembled on a printed circuit board (PCB). This can advantageously be done by conventional electronics assembly processes (such as reflow soldering). Preferably, the type of PCB can be an integrated metal substrate (IMS) or a direct-bonded copper (DBC) board that permit optimal heat dissipation. With this configuration, the electronic means required to operate the light emitting elements can be directly integrated in the light emitting substrate.

In another embodiment, light emitting elements are of various colours and are combined to mimic some specific light spectrums, such as the spectrum of the sun. Alternatively, the colour can be adjusted by dimming the intensity of the light emitting elements. This embodiment is advantageous for applications where the present invention is used as a mean to emulate the sun and/or follow natural circadian rhythms.

In a further embodiment of the present invention, the optical elements are of refractive type such as lenses including plano-convex, plano-concave, bi-convex, bi-concave, meniscus type and aspheric curvature having polynomial shape. Optical elements such as lenses with aspheric curvature (polynomial shape), including one or more inflection points, allow a higher design freedom to increase the angular acceptance and reduce optical aberrations.

In another preferred embodiment of the present invention, the optical elements comprises a central section capturing a central portion of the light beam emitted by the light emitting element and transmitting a central portion of the transmitted light and a peripheral section capturing an outer portion of the light beam emitted by the light emitting element and transmitting an outer portion of the transmitted light. Such optical elements design permit to dramatically increase the amount of light collected and redirected by the optical layer.

The central section can have one or two patterned faces, each with either positive or negative curvature (plano-convex, plano-concave, bi-convex, bi-concave or meniscus type), although it has preferably two surfaces for more design flexibility. The curvature of each surface can be a portion of sphere (i.e. spherical lens), but it is preferably aspherical with higher order polynomials (for instance 3rd order or higher). The higher order polynomials are advantageous to introduce inflexion points (changes in curvature polarity), in order to increase optics efficiency, and correct for optical aberrations. The curvature can even be free form, with small segments or facets connected to each other to form a profile that cannot be exactly described by a continuous function (polynomials). The lens profile can be rotationally symmetrical or just mirror symmetrical on one or two axes (e.g. bi-conic profile).

The peripheral section is preferably composed of one or a plurality of triangular, rectangular or more complex polygon cross-section extruded in revolution around the central section and completely surrounding it. The peripheral section can be composed of several concentric rings, each with different cross-sections and diameters, meshed into each other to form a more complex revolution shape with a discontinuous profile. The light rays emitted by the light emitting element and captured by the peripheral section are refracted at least once and may also experience total internal reflection one or more times against the walls of the peripheral element before exiting with the desired angle. The light rays traveling through the peripheral section can cross each other paths one or more time before exiting.

The combination of a central section and a peripheral section allows for a more granular control of the photometric distribution of the light output of the luminaire than a single continuous optical element. The central section of the optical element provides a collimated light beam, while the peripheral section of the optical element provides one or more peripheral light beams with wider propagation angles.

In another preferred embodiment of the present invention, at least some of the external walls of the peripheral section of the optical elements are coated with reflective coating such as metallization. This permits to increase the angles at which incident light rays can be reflected (i.e. without the angular limitations of total internal reflection) and increase optical efficiency.

In a further embodiment of the present invention, the optical elements are of reflective type such as mirrors. Using purely reflective optics reduces optical aberrations and especially chromatic aberrations, leading to better homogeneity of the light output, especially a more homogeneous color-over-angle distribution.

In another preferred embodiment of the present invention, the optical elements of the optical layer are made of glass, silicone rubber or a transparent polymer, such as polymethylmethacrylate (PMMA) or polycarbonate (PC). With the choice of the material for the optical layer, one can influence the dispersion (inverse of the Abbe number) of the luminaire. Normally, materials with high Abbe number are preferred since a high Abbe number implies that light of different wavelengths will follow the same path through the optical layer and will not be spatially separated. Of course, in other applications such separation can be desired and useful. Furthermore, these materials can normally be formed by cheap industrial processes (such as injection molding). Each optical element of the optical layer can be manufactured independently and then assembled (preferably glued) onto a common substrate to form the optical layer, or the optical layer can be manufactured directly as a single part (for instance injection molded within a single mold). A coating or a surface treatment can be applied to the optical elements to either increase reflectivity or diffusivity.

In another embodiment of the present invention, the diameter of the optical elements is in the range 5 to 50 mm, and preferably 10 to 30 mm.

In another embodiment of the present invention, the ratio between thickness and diameter of the optical elements is in the range 0.5 to 2, preferably 1.

In a further embodiment of the present invention, portions of the optical layer between the optical elements are coated with a partially opaque or diffusive layer. It can be advantageous to use partially opaque or diffusive portions of the optical layer to ensure that the internal structure of the luminaire is hidden from the view of observers located below. Preferably, these portions of the optical layer are translucent, in order to diffuse the portion of the light emitted by the light emitting elements which is not captured by the optical elements. The amount of light transmitted through the optical elements or directly through the portions of the optical layer between the optical elements can then be adjusted by the relative positioning of the light emitting elements.

In another embodiment of the present invention, static primary optical elements are arranged directly onto the light emitting elements. For instance, these primary elements can be collimating elements. This embodiment can be advantageous to restrict the angular range of the light emitted from the light emitting elements and to decrease the divergence of the luminaire output.

In a further embodiment of the present invention, the optical layer is attached to the front side of the static frame element, forming together an enclosure, which surrounds the light emitting substrate and the shifting mechanism. This is advantageous to protect the whole system (shifting mechanism, and light emitting substrate) from mechanical shocks, as well as from intrusion of various contaminants (such as liquids or dust). In this embodiment, all movable parts are surrounded by the enclosure and moving within its physical boundaries.

In a further embodiment of the present invention, the enclosure comprises a cover on the output side of the optomechanical system. This permits to protect the whole system (shifting mechanism, optical layer, and light emitting substrate) from mechanical shocks, as well as from contaminants.

In another preferred embodiment of the present invention, the static frame is at least partially open at the bottom and a flexible membrane seals the gap between the light emitting substrate and the static frame while allowing the light emitting substrate to move both laterally and vertically. This embodiment is advantageous when some movable parts have to be exposed to the environment, for instance to improve heat dissipation by exposing the backside of the light emitting substrate to ambient air while still providing a barrier to external contaminants.

In another preferred embodiment of the present invention, the light emitting substrate comprises at least two different types of light emitting elements, wherein the different light emitting elements differ in size, shape, spectra, collimation and/or intensity. With this is possible to have an emitted light with different components, for instance in intensity or colour.

In a further preferred embodiment of the present invention, at least one type of the light emitting elements is a thin material light emitting device, such as for instance an OLED, a LED, a laser, active fibers, other luminescent or fluorescent emitters or incandescent emitters, for example filaments.

In a further preferred embodiment of the present invention, at least one type of the light emitting elements is formed as a backlight emitting surface.

In another preferred embodiment of the present invention, at least one type of the light emitting elements is formed as a continuous light emitting surface that is provided with holes in which the other type of light emitting elements are placed.

In yet another preferred embodiment of the present invention, one type of the light emitting elements is placed on a partially cut or transparent front layer such that the light emitted by the other type of light emitting elements placed on a back layer is transmitted through the front layer towards the optical layer.

In another preferred embodiment of the present invention, the optomechanical system further comprises a control system wherein the control system sends commands to the optomechanical system either by wired connection or wirelessly to position the light emitting elements with respect to the optical elements in order to attain the desired photometric distribution of the luminaire. This embodiment is advantageous for maximum flexibility and applications where direct user input is regularly required, such as office or retail lighting applications. Preferably, the commands are sent using the DALI protocol, to be compatible with existing luminaire installations and controllable by a centralized interface.

In a second aspect, the objects of the present invention are achieved by a method for dynamically controlling the photometric distribution of a luminaires with an optomechanical system according to the present invention, comprising:

capturing incident light and transmitting transmitted light, moving either the optical layer or the light emitting substrate translationally relative to each other by means of a shifting mechanism, wherein the shifting mechanism moves the optical layer or the light emitting substrate translationally along at least one direction in such a way that the photometric distribution of the luminaire is controlled by adjusting the relative positions of the light emitting elements relative to the optical elements.

In a third aspect, the objects of the present invention are achieved by a luminaire comprising an optomechanical system according to the present invention.

In a first preferred embodiment of the present invention, the luminaire is designed as to emulate the spectrum and the photometric distribution curves of a natural source of light, such as the sun.

BRIEF DESCRIPTION OF THE DRAWINGS

The foregoing and other objects, features and advantages of the present invention are apparent from the following detailed description taken in combination with the accompanying drawings in which:

FIG. 11a illustrates the path of the light rays travelling through a refractive-type optical element when the light emitting element and the optical element are centred;

FIG. 11b illustrates the path of the light rays travelling through a refractive-type optical element when the light emitting element and the optical element are shifted relative to each other along a direction parallel to the light emitting substrate;

FIG. 11c illustrates the path of the light rays travelling through a refractive-type optical element when the light emitting element and the optical element are shifted relative to each other along a direction perpendicular to the light emitting substrate;

DETAILED DESCRIPTION OF THE PREFERRED EMBODIMENTS OF THE INVENTION

Figure 1A:
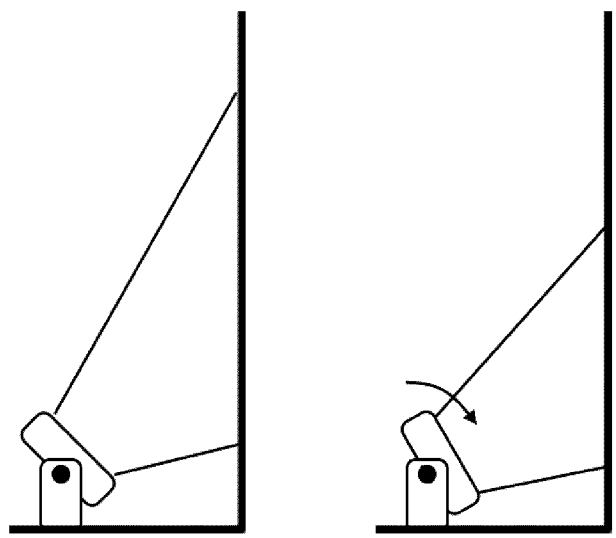
FIG. 1a is a schematic illustration of the main drawback of the solutions from prior-art.
Figure 1B:
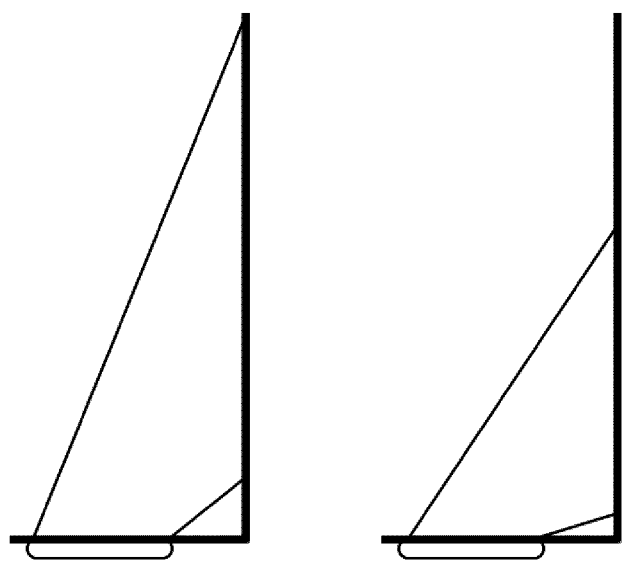
FIG. 1b is a schematic illustration of the aim of the present invention.
Figure 2A:
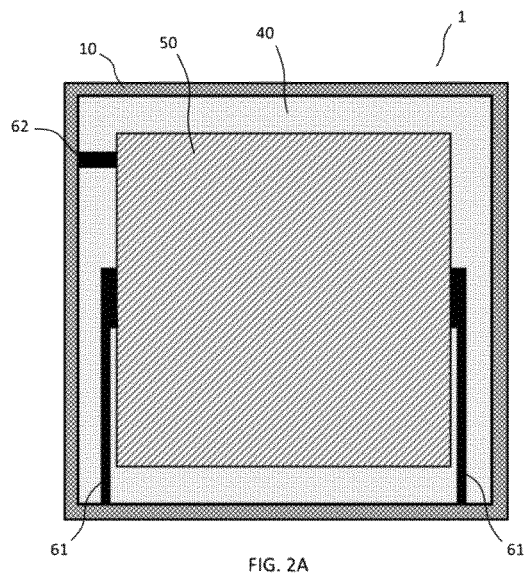
FIG. 2a is a schematic bottom view of an optomechanical system according to a first embodiment of the present invention where the optical system is at its neutral position.
Figure 2B:
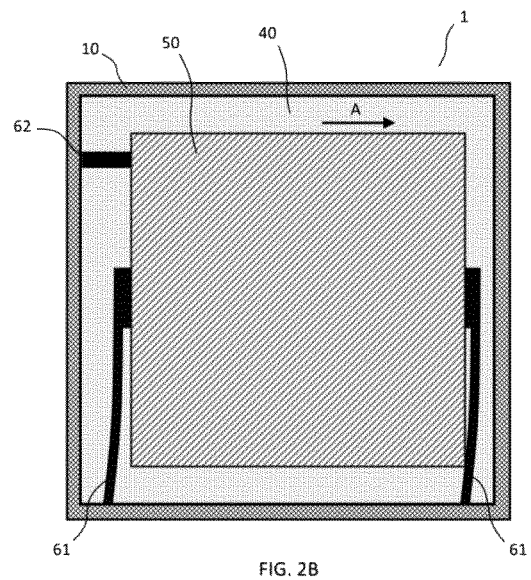
FIG. 2b is a schematic bottom view of an optomechanical system according to the first embodiment of the present invention where the light emitting substrate is in a shifted position.

FIGS. 2a and 2b display schematic bottom views, i.e. views from the light emitting elements towards the optical layer, of an optomechanical system 1 according to a first embodiment of the present invention. The optomechanical system 1 comprises a static frame 10, an optical layer 40 comprising a plurality of optical elements 41 (not shown in these Figures), a light emitting substrate 50 comprising a plurality of lights sources like LEDs, OLEDs, lasers or optical fibers (not shown here as well) and a shifting mechanism 60, which comprises in this embodiment guiding elements 61 and shifting element 62.

In the following, first details of several embodiments of the shifting mechanism 60 are presented, followed by details of several embodiments of the optical layer 40.

While FIG. 2a displays a first preferred embodiment of the optomechanical system 1 in its neutral position, i.e. with the light emitting substrate 50, the optical layer 40 and the static frame 10 centred with respect to each other, FIG. 2b shows the optomechanical system 1 with light emitting substrate 50 translationally displaced along the direction of the arrow A with respect to the static frame 10 and the optical layer 40 by means of the shifting mechanism 60. More precisely, the shifting element 62 pushed the light emitting substrate 50 and the guiding elements 61 ensured that the displacement of the light emitting substrate 50 is only translational, i.e. they blocked any spurious rotational movement of the light emitting substrate 50 around an axis perpendicular to the optical layer 40. In this embodiment of the present invention, the guiding elements 61 are preferably leaf springs and the light emitting substrate 50 and the optical layer 40 are parallel. Of course, it is also possible to have an optomechanical system 1 with a different inclination angle between the light emitting substrate 50 and the optical layer 40.

While in this first preferred embodiment of the present invention the light emitting substrate 50 is movable and the optical layer 40 is fixed, it shall be understood that the optomechanical system could feature a shifting mechanism 60 acting on a movable optical layer 40 with a fixed light emitting substrate 50 without departing from the scope of the present invention.

A movable light emitting substrate 50 and a fixed optical layer 40 is particularly appropriate in applications where the optical layer 40 would be visible to an observer/user and the shifting mechanism 60 should be hidden from his view (e.g. luminaire integrated into a ceiling). In other applications, however, it can be more advantageous to have a static light emitting substrate 50 and a movable optical layer 40, for instance in high power applications where a movable light emitting substrate 50 would make it difficult to properly dissipate heat.

As mentioned above, the relative motion of the light emitting substrate 50 and the optical layer 40 is preferably only translational along one or two directions parallel to the optical layer 40 and/or along one direction perpendicular to the optical layer 40. The shifting mechanism 60 is advantageously arranged in such a way that it suppresses any possible rotation and to make sure that the optical layer 40 and the light emitting substrate 50 remain parallel to each other at all time. This ensures that the distance between the light emitting elements 51 and the corresponding optical elements 41 is the same on the entire surface of the luminaire.

Figure 3A:
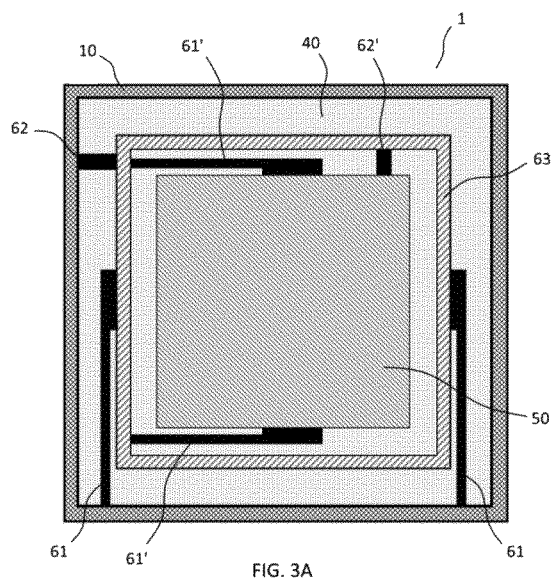
FIG. 3a is a schematic bottom view of an optomechanical system according to a second embodiment of the present invention where the optical system is at its neutral position.
Figure 3B:
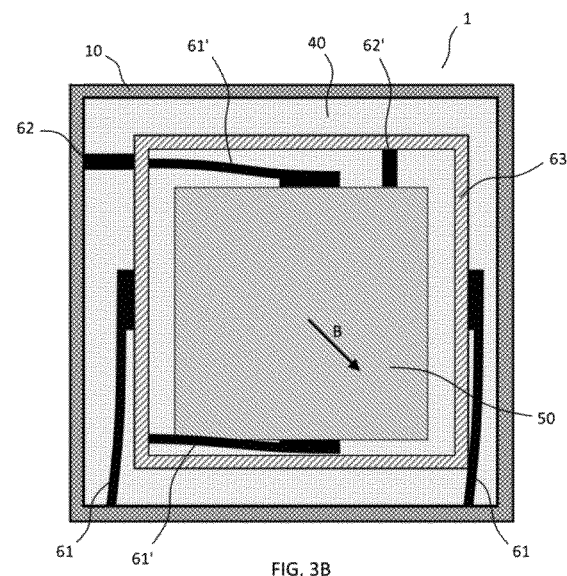
FIG. 3b is a schematic bottom view of an optomechanical system according to the second embodiment of the present invention where the light emitting substrate is at a shifted position.

In a second preferred embodiment of the present invention, shown in FIGS. 3a and 3b, two pairs of guiding elements 61, 61' and two shifting elements 62, 62' are combined to guide the movement of the movable element, the light emitting substrate 50 in this embodiment, along two perpendicular axes. The first pair of guiding elements 61 and the first shifting element 62 are arranged to move a translation element 63 along a first direction. The second pair of guiding elements 61' and the second shifting element 62' are arranged inside the translation element and are configured to move the light emitting substrate 50 along a second direction perpendicular to the first one. With the combination of two pairs of guiding elements 61, 61' and two shifting elements 62, 62', a displacement of the light emitting substrate 50 along any direction B parallel to the light emitting substrate 50 can be achieved. The amplitude/range of the translation along each axis can be adapted to the requirements of the application. The movement is typically proportional and of the same order of magnitude as the size (diameter) of the optical elements.

Figure 4:
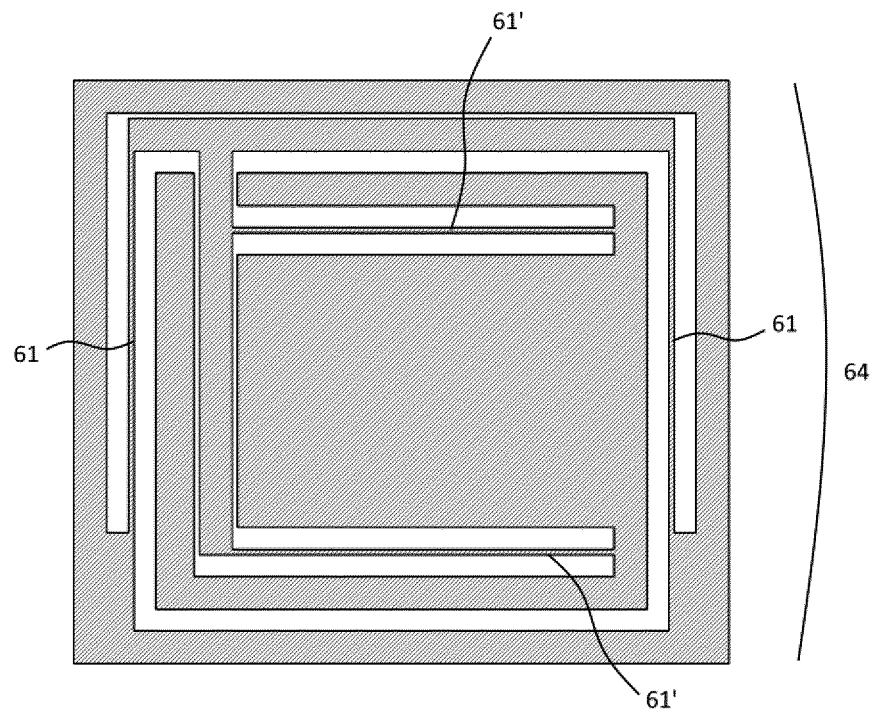
FIG. 4 is a schematic top view of an optomechanical system according to a third embodiment of the present invention.

FIG. 4 shows a third preferred embodiment of the present invention. In this embodiment, two leaf spring pairs 61, 61' are arranged along two perpendicular in-plane axes and are formed a planar leaf spring module 64, which can be machined from a single piece of material to minimize assembly costs and tolerances. A light emitting substrate 50 can be mounted onto the central region of the planar module 64, which it is attached to the static frame 10 (not shown here) of the optomechanical system 1. By doing so, the light emitting substrate 50 can be displaced in any direction parallel to the plane of the planar module 64 with respect to the static frame 10 and to the optic layer 40 (not shown here as well). The arrangement of the leaf spring pairs 61, 61' permits to minimize or fully cancel spurious movement along the leaf spring axis.

Figure 5:
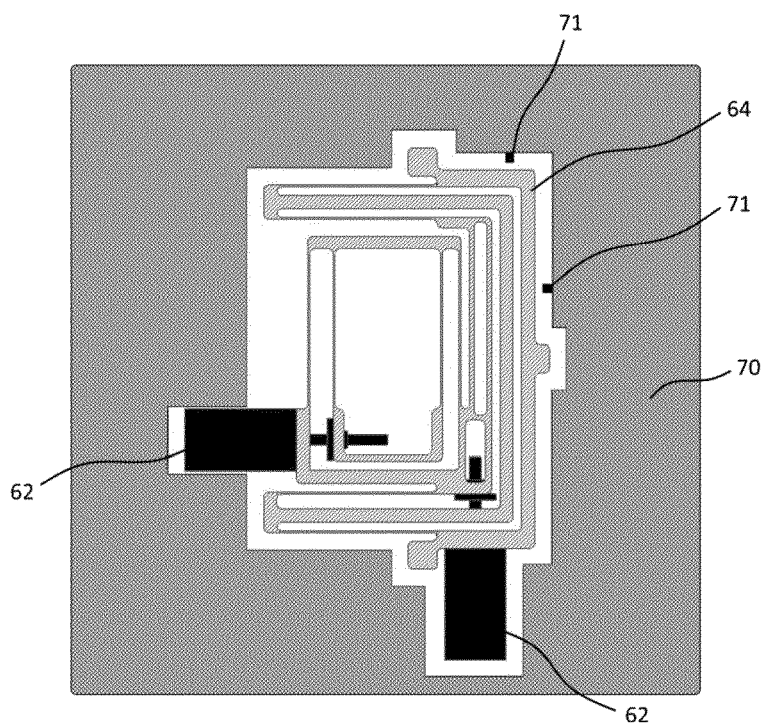
FIG. 5 is a schematic top view of an optomechanical system according to a fourth embodiment of the present invention.

In a fourth preferred embodiment of the present invention, a planar leaf spring module 64 is actuated by two shifting elements 62, which here take the form of linear actuators. The actuators are directly attached to the planar module as shown in FIG. 5. In this embodiment, the leaf spring module 64 and the linear actuators 62 are furthermore surrounded by an electronic board 70 for the control of the actuator. The electronic control board 70 includes also two switches 71, which provide a feedback signal when the planar leaf spring 64 module reaches its maximum displacement position. This embodiment is particularly advantageous when the space dedicated to the guiding and actuation system is limited. A light emitting substrate 50 or an optical layer can be attached onto the planar module 64 of this preferred embodiment to allow their movement.

Figure 6:
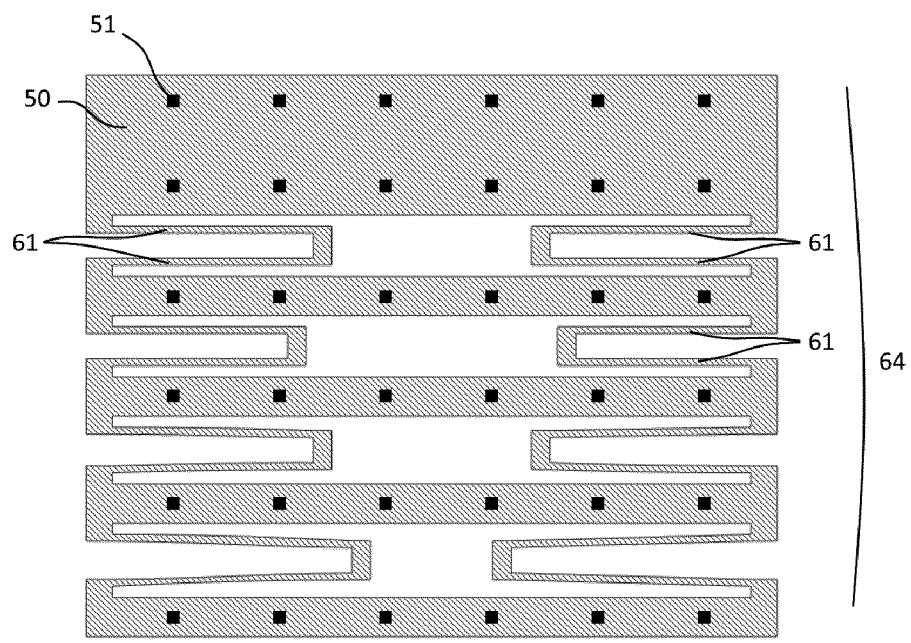
FIG. 6 is a schematic top view of an optomechanical system according to a fifth embodiment of the present invention.

In a fifth embodiment of the present invention, illustrated in FIG. 6, the light emitting substrate 50 itself is a planar leaf spring module. More specifically, leaf springs 61 are machined directly into the light emitting substrate 50, so that the light emitting substrate 50 itself can contribute to guide the movement of the light emitting elements 51 relative to the optical elements 41 (not shown in this Figure). This embodiment is advantageous to reduce the number of components, to simplify assembly and reduce costs.

Figure 7A:
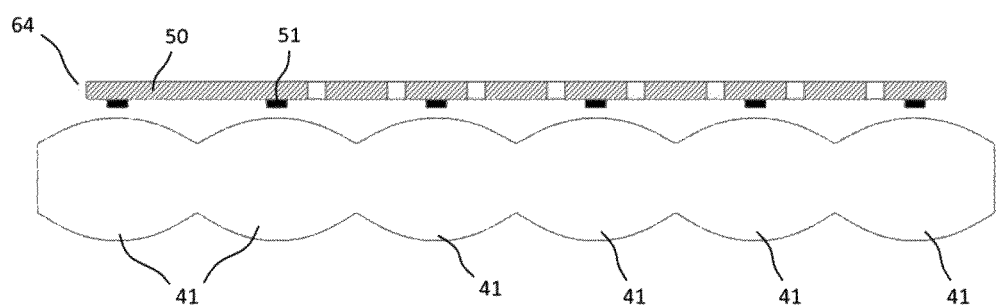
FIG. 7a is a schematic side view of an optomechanical system according to a sixth embodiment of the present invention where the light emitting elements are in their neutral position.
Figure 7B:
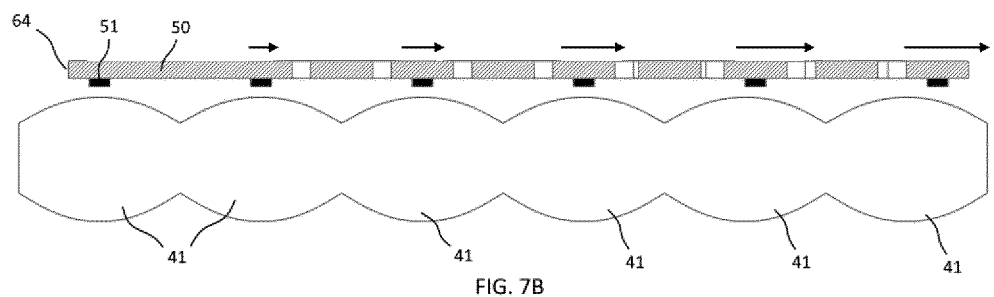
FIG. 7b is a schematic side view of an optomechanical system according to the sixth embodiment of the present invention where the light emitting elements are in a shifted position.

In a sixth embodiment of the present invention, the planar leaf spring module 64 machined into the light emitting substrate 50 is designed in such a way that the displacement of the light emitting elements 51 relative to their respective optical elements 41 is not constant on the entire surface but is rather dependent on their position on the light emitting substrate 50 or the leaf spring module 64 respectively, as illustrated by the arrows of different length in FIG. 7b.

Figure 7C:
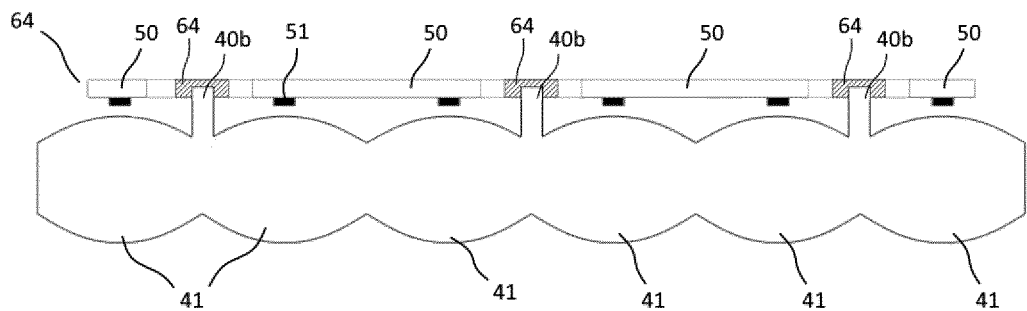
FIG. 7c is a schematic side view of an optomechanical system according to a variation of the sixth embodiment of the present invention.

FIG. 7c illustrates a variation of the sixth embodiment of the present invention wherein the optical layer 40 or the optical elements 41 comprise some attachment elements 40b, such as pins, in order to create a direct attachment between the optical layer 40 and the leaf spring module 64.

Figure 21:
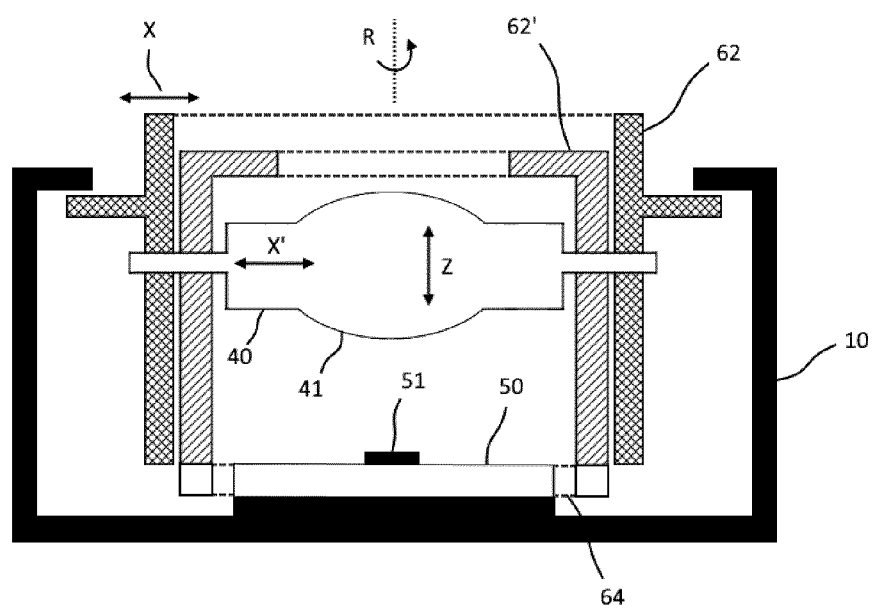
FIG. 21 is a schematic cross-sectional side view of the optomechanical system according to an eighteenth embodiment of the present invention where the optomechanical system comprises a shifting mechanism in the form of a mechanical cam system.

As illustrated in FIG. 21, the optomechanical system can comprise a shifting mechanism 62 in the form of a mechanical cam system with an outer shell 62e and an inner shell 62d, where the inner shell 62d is mounted a planar guiding module 64. The cam system is configured such that a horizontal translation along direction X of the outer shell 62e produces a horizontal translation X' of the optical layer 40, and a rotation R of the outer shell 62e, translates into a vertical translation Z of the optical layer 40. By means of the cam system, it is therefore possible to control in a simple manner the distance between the emitting layer 50 and the optical layer 40.

It is of course possible to have the light emitting substrate 50 attached to the planar guiding module 64, or the light emitting elements 51 can be directly mounted in the planar guiding module as shown in FIG. 6.

The optomechanical system according to FIG. 21 is advantageous where both the direction of transmitted light and its divergence should be adjustable. A horizontal translation along X or along the out-of-plane axis Y (not shown on the figure), will change the lateral position of the optical layer 40 relatively to the light emitting substrate 50, which will change the direction of the transmitted light 90.

Figure 8:
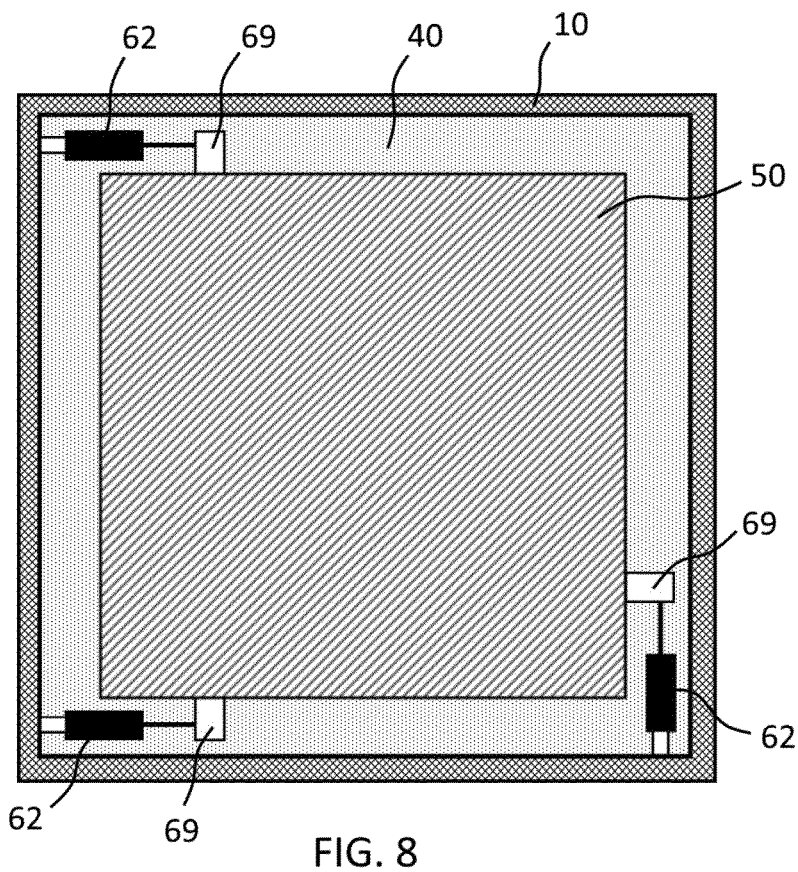
FIG. 8 is a schematic bottom view of an optomechanical system according to a seventh embodiment of the present invention.

FIG. 8 displays a seventh embodiment of the present invention, in which the optomechanical system 1 comprises two or more linear actuators 62 disposed in parallel on the same translational axis but at opposite ends of the movable element, and one or more actuators 62 disposed in a direction perpendicular to the first two. This arrangement allows for cancelling any spurious rotation around an axis perpendicular to the light emitting substrate 50, in order to ensure that there is no relative rotation between the light emitting substrate 50 and the optical layer 40. Preferably, the attachment elements 69 at one or both ends of the actuators 62 (from each actuator to the frame and to the movable element) are single or double universal joints, cardan joints or ball joints, in order to allow the actuators to rotate around the axes perpendicular to their own movement, such as to minimize shear forces on the actuator axis. In this embodiment, the actuators 62 themselves are acting as guiding elements that cancel any rotation of the movable element 40, 50.

Figure 23:
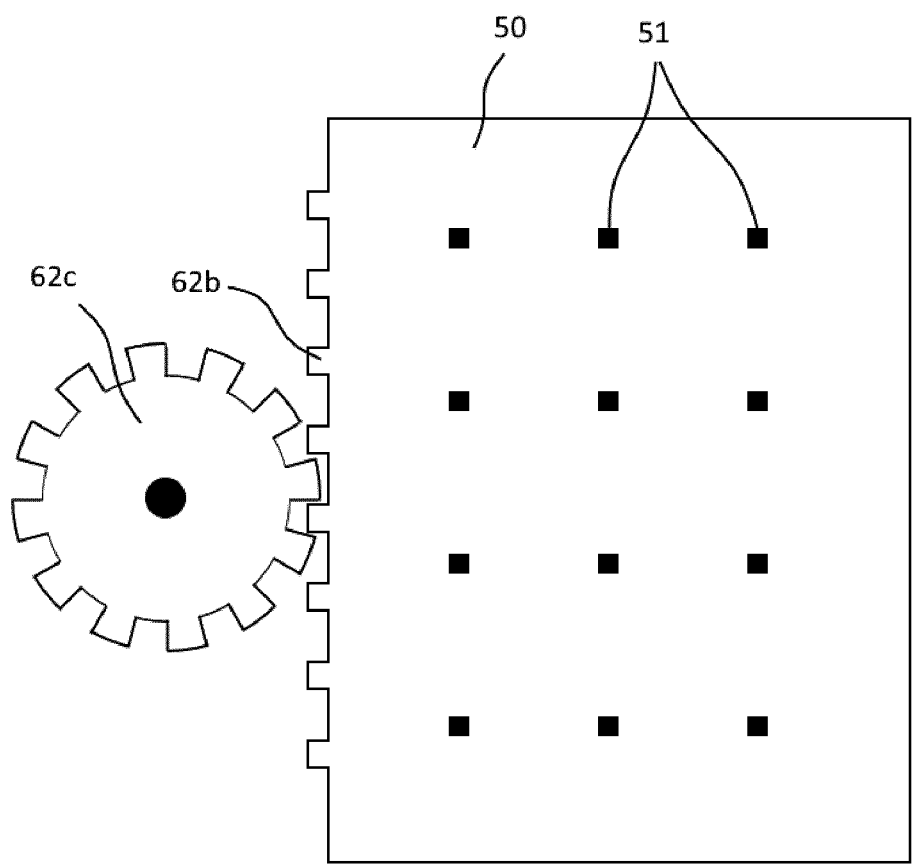
FIG. 23 is a schematic top view of the optomechanical system according to a twentieth embodiment of the present invention where the shifting element takes the form of a rack/pinion system.

As can be seen from FIG. 23, the linear displacement of the optical layer 40 and/or of the light emitting substrate can be obtained by means of shifting element 62 in form of a rack/pinion system. Advantageously, the rack element 62b is directly formed in the element to be moved, i.e. the light emitting substrate 50 in this Figure. Nevertheless, the rack element 62b could be as well be formed in the optical layer. The pinion element 62c is, advantageously, attached to the frame 10 (not shown here). Important to note is that two or three pinion/rack systems can be combined to achieve linear translations along three different directions.

Details of several embodiments of the optical layer 40 comprising the optical elements 41 will now be presented. Light from quasi-punctual light emitting elements 51 such as LEDs is usually emitted with a near Lambertian profile, i.e. over a very large range of angles, with energy distributed evenly on a half-sphere profile. Due to fundamental physical limitations (numerical aperture), a single optical element 41 cannot capture all the light emitted by this type of source, unless it is located infinitely close to it, or is infinitely larger than it. However, by designing optical elements 41 with several discontinuous sections/profiles, it is possible to increase the amount of light collected and redirected by the optical layer 40.

Figure 9A:
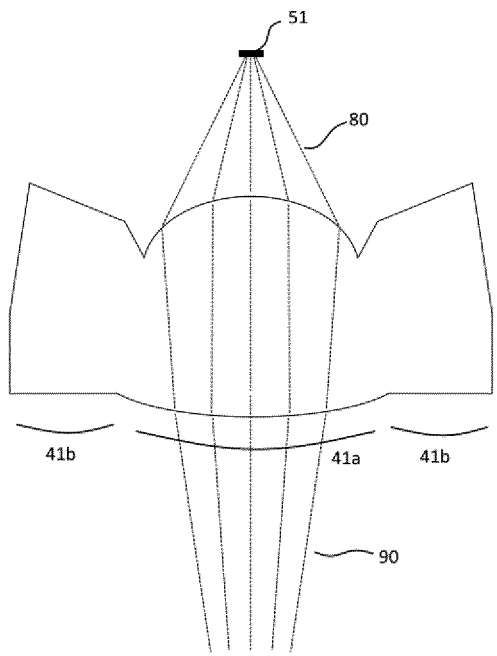
FIG. 9a is a schematic cross-sectional view of a refractive-type optical element according to an eight embodiment of the present invention, illustrating the path of light rays travelling through the central section of the optical element.
Figure 9B:
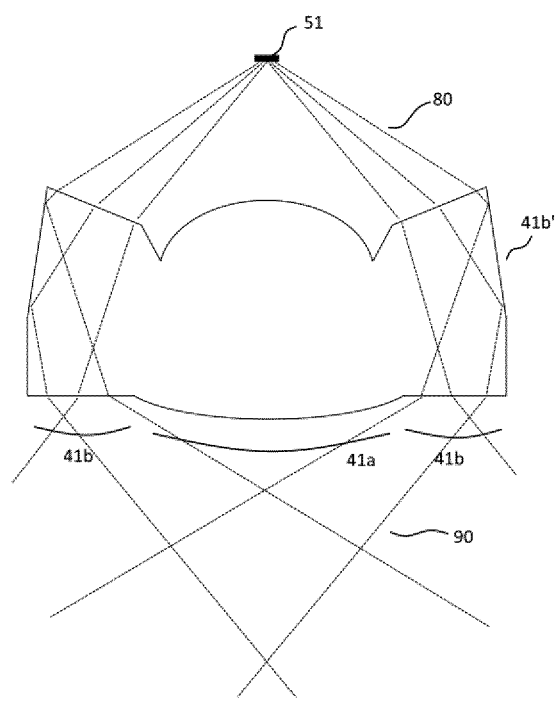
FIG. 9b is a schematic cross-sectional view of a refractive-type optical element according to the eight embodiment of the present invention, illustrating the path of light rays travelling through the peripheral section of the optical element.

In an eight preferred embodiment of the present invention, the optical elements 41 are of refractive type and they are composed of two main sections: a central section 41a and a peripheral section 41b, as shown in FIGS. 9a and 9b. The central section 41a is arranged to collect the central portion of the emitted light 80 by the light emitting element 51 (i.e. the light emitted at smaller angles). The central section 41a can have one or two patterned faces, each with either positive or negative curvature (plano-convex, plano-concave, bi-convex, bi-concave or meniscus type), although it has preferably two surfaces for more design flexibility. The curvature of each surface can be a portion of sphere (i.e. spherical lens), but it is preferably aspherical with higher order polynomials (for instance third order or higher). The higher order polynomials are advantageous to introduce inflexion points (changes in curvature polarity), in order to increase optics efficiency, and correct for optical aberrations. The curvature can even be free-form, with small segments or facets connected to each other to form a profile that cannot be exactly described by a continuous function (polynomials). The lens profile can be rotationally symmetrical or just mirror symmetrical on one or two axes (e.g. bi-conic profile), depending on the desired contour or pattern of the illuminated area at the output of the luminaire The peripheral section 41b is arranged to collect the outer portion of the emitted light 80 by the light emitting element 51 (i.e. the light emitted at larger angles). The peripheral section 41b is composed of one or a plurality of triangular, rectangular or more complex polygon cross-section extruded in revolution around the central lens of the central section 41b and completely surrounding it. The peripheral section 41b can be composed of several concentric rings, each with different cross-sections and diameters, meshed into each other to form a more complex revolution shape with a discontinuous profile. The light collected by the peripheral section 41b is refracted at least once and may also experience total internal reflection one or more times against the walls of the peripheral section 41b' before exiting with the desired angle, as illustrated in FIG. 9b. The light rays traveling through the peripheral section 41b can cross each other paths one or more time before exiting, so that they exit the optical element with the desired tilt angle. While the contour of the peripheral section 41b is preferably circular, it can also have other shapes (such as a rectangular shape) depending on the desired pattern of the illuminated area at the output of the luminaire.

The combination of a central section 41a and a peripheral section 41b allows for a finer control of the light distribution (or photometric distribution) at the output of the luminaire than a single continuous optical element 41. Reflective coating can be added to at least some of the external walls 41b' of the peripheral section 41b of the optical element 41 in order to increase the angles at which incident light rays 80 can be reflected (i.e. without the angular limitations of total internal reflection) and increase optical efficiency.

Figure 10:
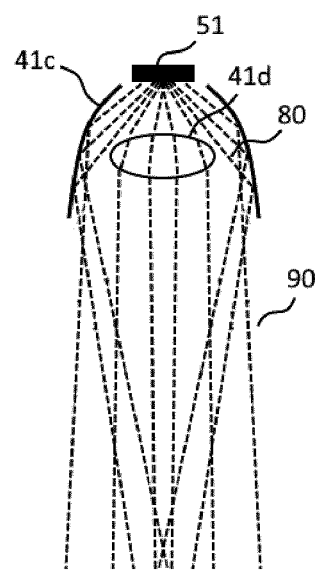
FIG. 10 is a schematic cross-sectional view of a reflective-type optical element according to a ninth embodiment of the present invention, illustrating the path of light rays travelling through the optical element.
Figure 12A:
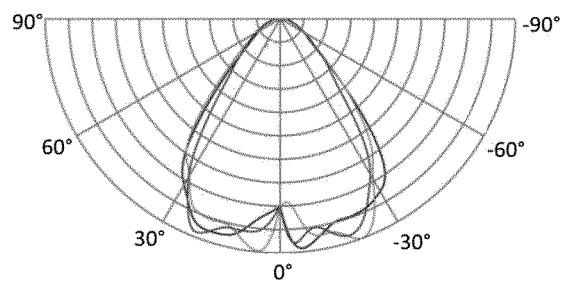
FIGS. 12a to 12d show some photometric distribution curves achievable with the present invention.
Figure 12B:
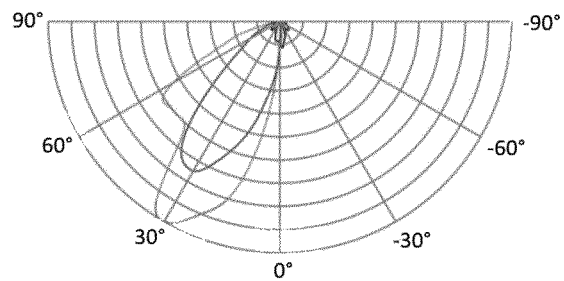
Figure 12C:
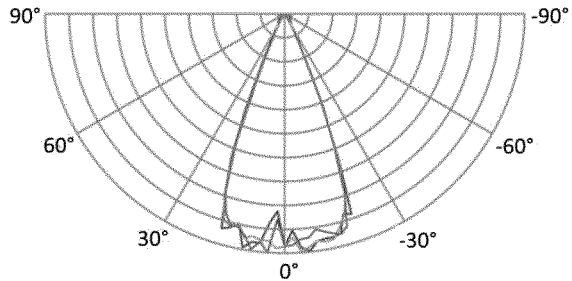
Figure 12D:
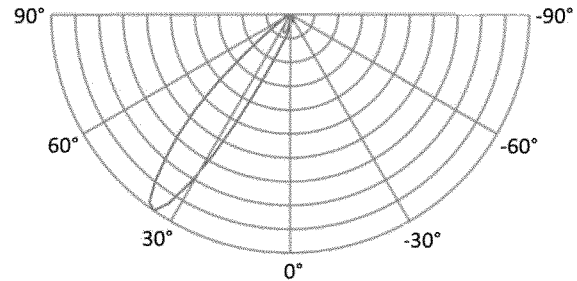

FIG. 10 illustrates a tenth embodiment of the present invention. In this embodiment, the optical element 41 comprises a fully reflective optical element 41c, i.e. a "cavity" with reflective walls surrounding the light emitting element 51 and a refractive optical element 41d, for instance a lens that is placed inside this cavity. Using a combination of reflective and refractive optics reduces the optical aberrations and especially chromatic aberrations, leading to better homogeneity of the light output (more homogeneous color-over-angle distribution).

FIGS. 11a to 11c show that by translating a quasi-punctual light emitting element 51 relative to the optical element 41 (or vice-versa), the distribution of the emitted light 80 over the optical element 41 changes (different portions of the emitted light 80 hit different portions of the optical element 41), such that both the direction (tilt) and distribution (divergence) of the output beam 90 change accordingly. More specifically, moving the light emitting element 51 and the optical element 41 farther from or closer to each other has a direct impact on the degree of divergence of the output beam 90, while a lateral movement ("in-plane" movement) has a direct impact on the orientation of the output beam 90. Combining both movements results in a dynamic control of both divergence and orientation of the luminaire output, i.e. the photometric distribution, as illustrated in FIGS. 11a to 11c.

The present invention is advantageous to generate dynamic photometric curves. More specifically, the relative movement of the optical layer 40 and the light emitting substrate 50 changes the light distribution at the output of the luminaire, and especially allows to adjust the tilt of the light output beam to almost any desired angle. By adjusting the shape of the optical elements 41, the light output can be adjusted to match almost any desired angular distribution. For instance, a wall washer application typically requires wide light emission angles in order to get a homogeneous light distribution from the ceiling to the floor, while spotlight applications require smaller emission angles for a more focused light output. FIGS. 12a to 12d illustrate some photometric curves achievable with optomechanical systems according to the present invention, in which the radial axes represent the normalized energy intensity and the circular axis represents the inclination angle. Each curve of each plot is a cross-section along a specific azimuthal plane of the 3D light distribution at the output of a luminaire using the present invention. These curves are just a few examples of some of the photometric outputs achievable with the present invention, but many other photometric outputs are possible. The distribution and orientation of the light distribution can be adjusted over a wide range of values depending on the shape of the optical elements and the relative position of the optical layer and the light emitting substrate.

Figure 13A:
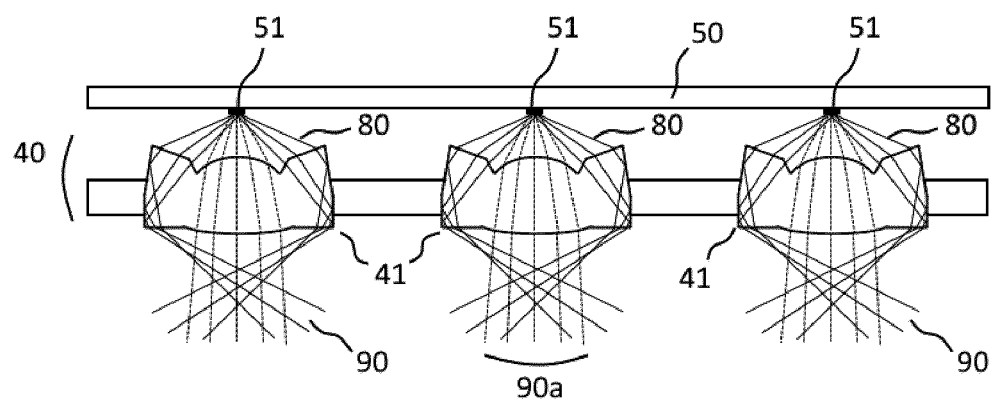
FIG. 13a is a schematic cross-sectional side view of the optomechanical system according to a tenth embodiment of the present invention when the light emitting elements and the optical elements are centred.
Figure 13B:
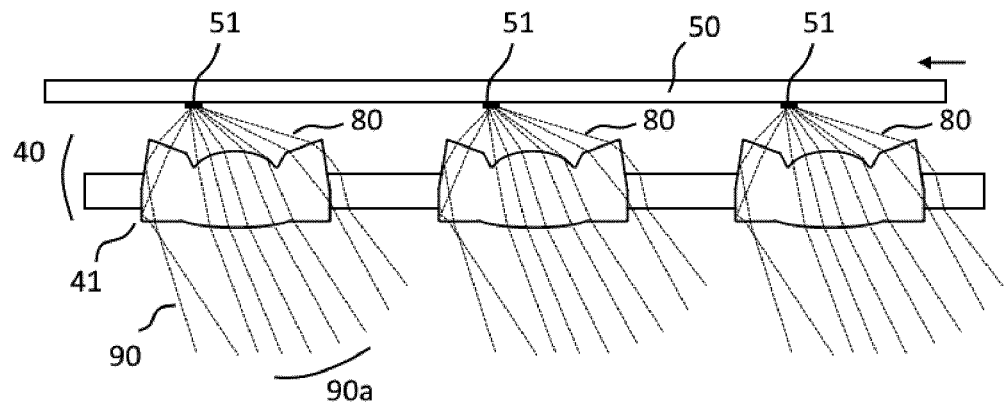
FIG. 13b is a schematic cross-sectional side view of the optomechanical system according to the tenth embodiment of the present invention when the light emitting elements and the optical elements are shifted relative to each other.

In an eleventh embodiment of the present invention, shown in FIGS. 13a and 13b, a plurality of light emitting elements 51 are arranged in an array moving relatively to an array of optical elements 41 to form a larger output beam with the combined outputs 90 of all the optical elements 41. The central light beam 90a (substantially collimated beam) has divergence angles preferably within ±25° and more preferably within ±15°. The tilt of the output beam can preferably be controlled within ±25°, more preferably within ±45° and even more preferably within ±60°.

The optical elements 41 of the optical layer 40 can for instance but not exhaustively be made of glass, acrylic (PMMA), silicone rubber or other transparent polymers. They are preferably made of a material than has high optical transmission and low dispersion (high Abbe number), and which can be easily formed by cheap industrial processes (such as injection moulding), such as PMMA or silicone rubber. Each optical element 41 of the optical layer 40 can be manufactured independently and then assembled (preferably glued) onto a common substrate to form the optical layer 40, or the optical layer 40 can be manufactured directly as a single part (for instance injection moulded within a single mold). A coating or a surface treatment can be applied to the optical elements 41 to either increase reflectivity or diffusivity.

The diameter of the optical elements 41 is typically in the range 1 to 50 mm, and preferably 10 to 30 mm. The ratio of the thickness divided by the diameter of the optical elements 41 is typically 0.5 to 2, and preferably close to 1.

The density of optical elements 41 on the optical layer 40 can be adjusted depending on the application requirements. There is typically one optical element 41 per light emitting element 51, but there can be more or less optical elements 41 than light emitting elements 51. For instance, it can be advantageous to have two or more optical elements 41 with different shapes on the same optical layer 40, in order to combine different photometric characteristics in the luminaire output. Alternatively, there can be multiple optical elements 41 per light emitting element 51, so that the light emitting element 51 can be positioned to face any of them, resulting in different photometric outputs.

Figure 14A:
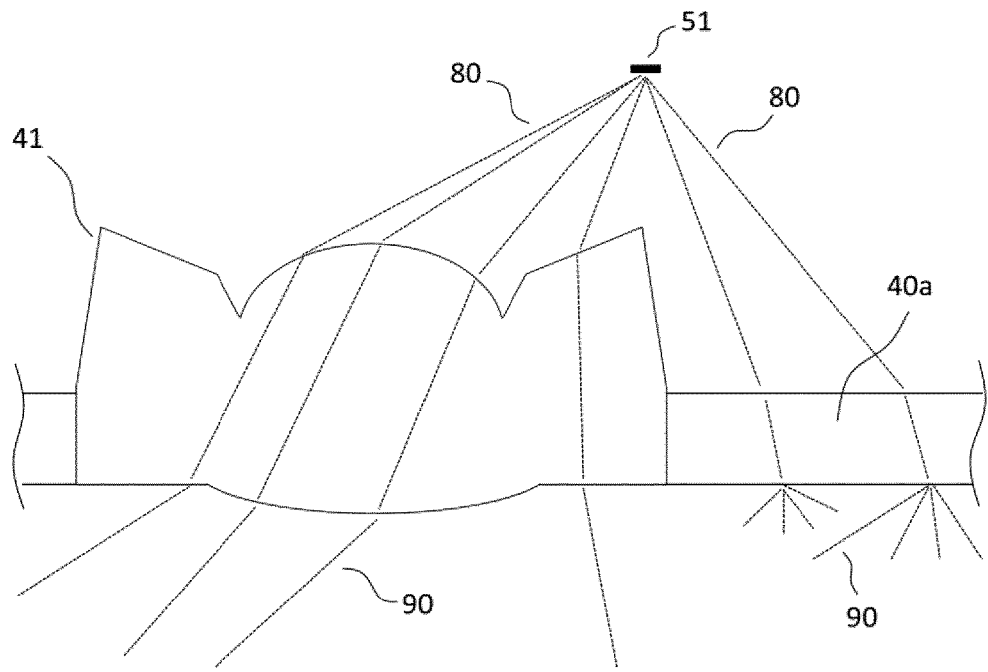
FIG. 14a is a schematic cross-sectional side view of the optical layer according to an eleventh embodiment of the present invention.

While the individual optical elements 41 are preferably transparent, the parts 40*a* of the optical layer 40 between the optical elements 41 can be partially opaque or translucent. For instance, it can be advantageous to use opaque or slightly translucent parts 40*a* of optical layer 40 to ensure that the internal structure of the luminaire is hidden from the view of observers located below. In a thirteenth embodiment of the present invention, the parts 40*a* of the optical layer 40 can be translucent, in order to diffuse the portion of the light emitted 80 by the light emitting elements 51 which is not captured by the optical elements 41, i.e. to improve the homogeneity of the photometric distribution of the luminaire, as shown in FIG. 14. The amount of light transmitted through the optical elements 41 or directly through the parts 40*a* of the optical layer 40 can then be adjusted by the relative positioning of the light emitting elements 51 by means of the shifting mechanism 60 (not shown here).

Figure 14B:
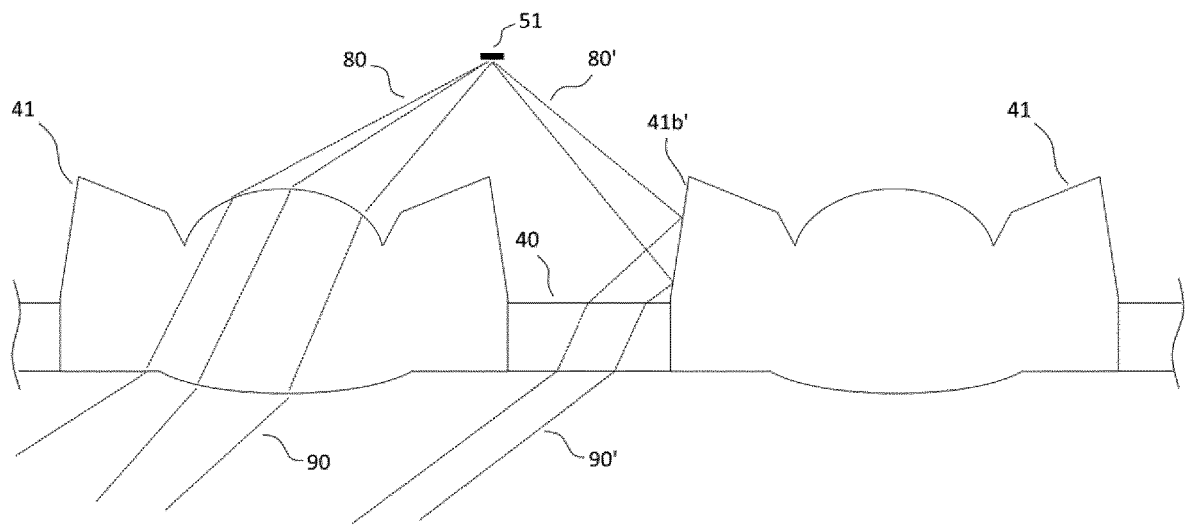
FIG. 14b is a schematic cross-sectional side view of the optical layer according to a further embodiment.

FIG. 14*b* illustrates that in a further embodiment, the external surfaces of the peripheral sections 41*b*' of the optical elements 41 are coated with a reflective coating in order to redirect the light 80' that is emitted by the light emitting element 51 and that is directly captured neither by the optical element 41 placed directly underneath the light emitting element 51 nor by the portion 40*a* of the optical layer 40. This reflected beam travels through the portion 40*a* of the optical layer 40 to form the output light 90'. The latter forms with the output beam 90, which is the result of the refraction of the light emitted 80 directly captured by the optical element 41 placed underneath the light emitting element 51, the overall transmitted light. With the coating of the external surface 41*b*' of the peripheral section of the optical elements 41, one can thus easily increase the light intensity transmitted through the optical layer. By adjusting the orientation of the reflective external surfaces 41*b*', it is possible to influence the angle under which the beam 90' is transmitted.

Figure 22:
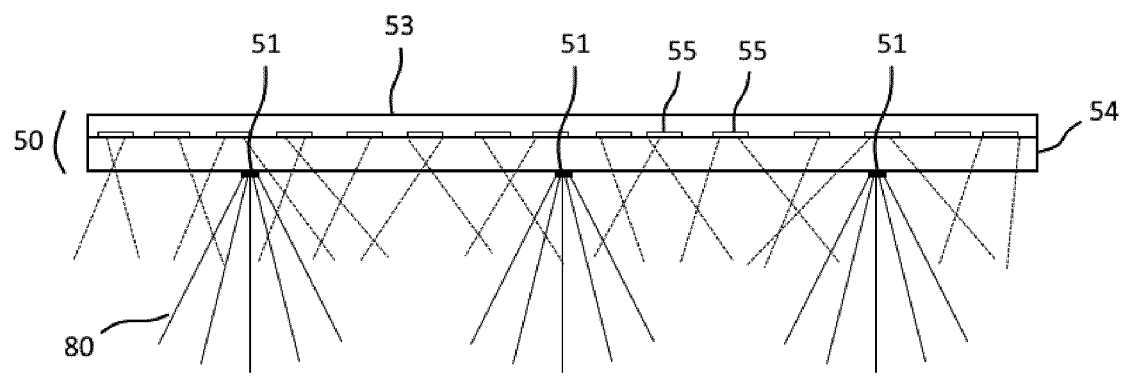
FIG. 22 is a schematic cross-sectional side view of the optomechanical system according to a nineteenth embodiment of the present invention where the light emitting layer is composed of light emitting elements of at least two different types.

As illustrated in FIG. 22, it is possible to foresee that the light emitting layer 50 is composed of light emitting elements 51,55 of at least two different types. The light emitting elements 51,55 can, for instance, differ in size, shape, emission spectrum, collimation and/or intensity. As shown in FIG. 22, it is possible to arrange the different light emitting elements 51,55 in a front layer 54 and in a back layer 53 of the light emitting substrate 50. The light emitting elements 55 placed in the back layer 53 emit light that is transmitted through the transparent or translucent front layer 54. With the addition of the optical layer 40 (not shown) comprising the optical elements provided to collect and transmit the light emanating from the light emitting elements 51, it is possible to create an optomechanical system that emits light with both directional and diffusive components. As mentioned above, the light emitting elements 51,55 can also differ in their emitted spectrum. It is therefore possible, to provide an optomechanical system capable of simulating a natural source of light, such as the sun, that comprises both directional and diffusive light components and a combination of colour temperatures.

Important to note that the back layer 53 could act as a backlight emitting substrate. In this case the light emitting elements 55 are not directly placed in the back layer 53 but advantageously on the side of it. With mirrors or prisms the light can be redirected in direction of the front layer 54.

Of course it is also possible to foresee that the light emitting elements 51 are placed between the light emitting elements 55 and in the same plane as the latter. In that case, it is possible to foresee holes in the layer comprising the light emitting elements 55 into which the light emitting elements 51 are placed. Furthermore, it is also possible to foresee that the front layer 54 has a variable thickness. In particular, it can be foreseen that the front layer 54 is only provided where a light emitting element 55 is located.

Figure 15:
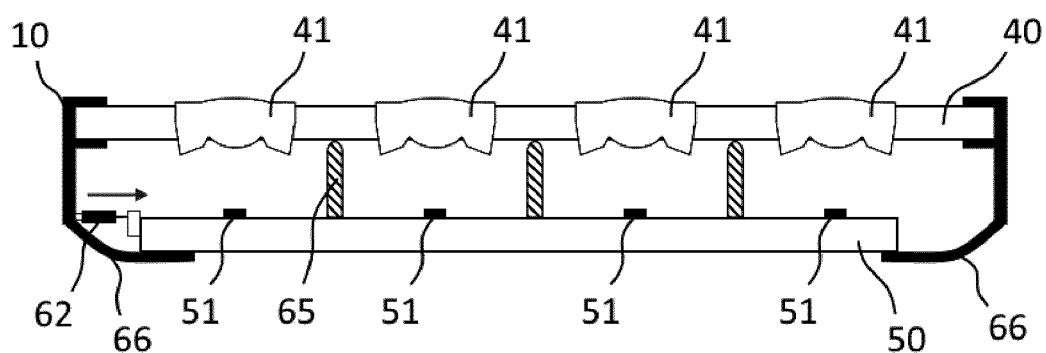
FIG. 15 is a schematic cross-sectional side view of the optomechanical system according to a twelfth embodiment of the present invention.

In a fourteenth preferred embodiment of the present invention, one or a plurality of sliders 65 are arranged between the optical layer 40 and the light emitting substrate 50. The sliders 65 are rigid elongated elements with at least one end designed to slide on another surface. The sliders 65 can be attached to the optical layer 40 and sliding on the light emitting substrate 50, or vice-versa. The surface on which the sliders 65 are sliding can be arranged with a specific layer or coating to decrease friction. With the sliders 65, it is ensured that the distance between the optical layer 40 and the light emitting substrate 50 is constant on their whole surface. Some pre-constraint elements 66 can be added to ensure that the sliders 65 are always in contact with the surface they are sliding on. In FIG. 15, the sliders 65 are pre-constrained by pre-constraint elements 66, which are part of the light emitting substrate 50 or the frame 10 itself. With this embodiment, the number of parts can be reduced by removing the need for additional pre-constraint elements such as springs.

Figure 16:
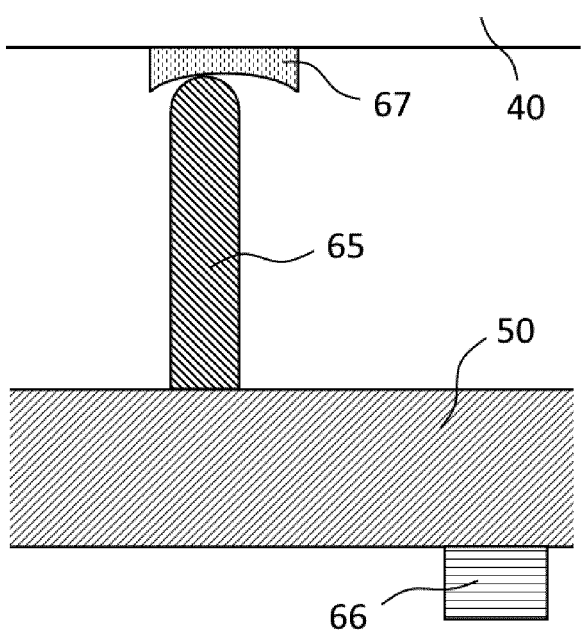
FIG. 16 is a schematic cross-sectional side view of the optomechanical system according to a thirteenth embodiment of the present invention.

In a further embodiment of the present invention, presented in FIG. 16, sliding elements 67 can be arranged on the optical layer 40 or the light emitting substrate 50 in front of the sliders 65. The shape of these sliding elements 67 can be designed in such a way that a horizontal movement of the sliders 65 induces a vertical displacement, which changes the distance between the optical layer 40 and the light emitting substrate 50. The sliding elements 67 can therefore advantageous be used to adapt the distance between the optical layer 40 and the light emitting substrate 50 without requiring an additional linear actuator.

Figure 17:
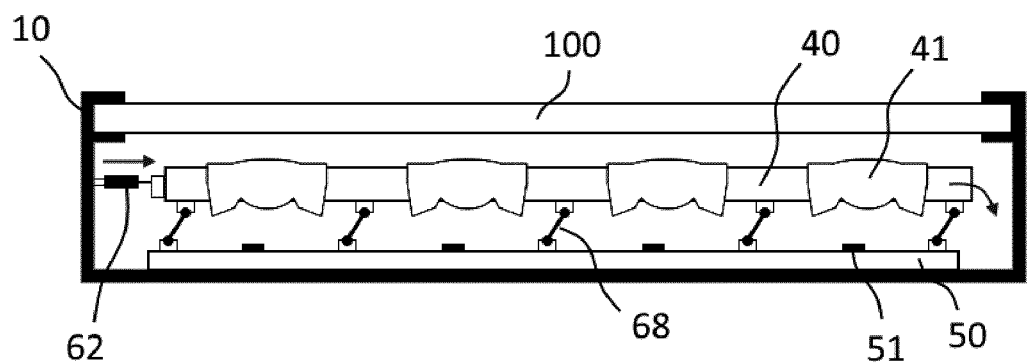
FIG. 17 is a schematic illustration of a control system for the optomechanical system according to a fourteenth embodiment of the present invention.

In a sixteenth preferred embodiment of the present invention, illustrated in FIG. 17, one or a plurality of flexible elements 68, for instance double universal joints, cardan joints or ball joints, are arranged between the optical layer 40 and the light emitting substrate 50, in order to guide the relative movement of these two elements on a sphere. More specifically, when a linear actuator 62 moves the optical layer 40 or the light emitting substrate 50 along an in-plane axis the resulting movement has both an in-plane and an out-of-plane component. With this embodiment, it is simple to adapt the distance between the optical layer 40 and the light emitting substrate 50 without requiring an additional linear actuator along a direction perpendicular to the plane of the light emitting substrate 50. A person skilled in the art would understand that the universal joints, cardan joints or ball joints of this embodiment can be substituted with flexible guiding elements such as leaf springs or ropes. By doing so, instead of being guided on a sphere, the movement is guided on an aspherical curvature (e.g. paraboloid or similar).

In the embodiment of the present invention presented in FIG. 17, the optical layer 40 and the light emitting substrate 50 are completely surrounded by a rigid enclosure comprising the static frame 10 and the cover 100, where the static frame 10 is preferably made of metal or rigid polymers and the cover 100 of glass. This is advantageous to protect the whole system (shifting mechanism 60, optical layer 40, light emitting substrate 50 and electronics 70) from mechanical shocks, as well as from intrusion of various contaminants (such as liquids or dust). In this embodiment, all movable parts are surrounded by the rigid enclosure and moving within its physical boundaries.

Figure 20:
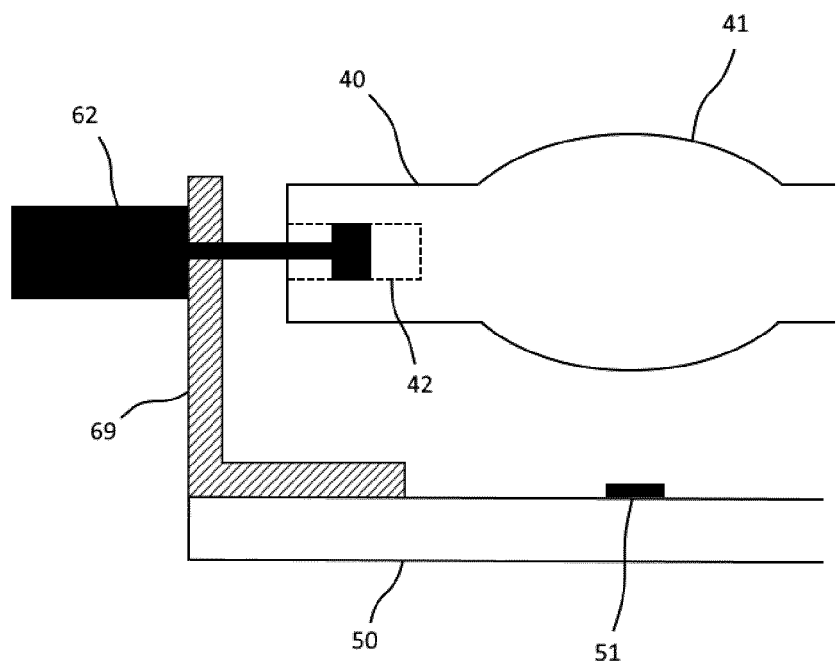
FIG. 20 is a schematic cross-sectional side view of the optomechanical system according to a seventeenth embodiment of the present invention where the linear actuators provided for the translational movement of the optical layer comprises a lead screw male part, which cooperates with a lead screw female thread integrated in the optical layer.

FIG. 20 displays a further embodiment of the present invention, in which the optomechanical system 1 comprises two or more linear actuators 62 mounted on attachment elements 69, which are fixed to the light emitting substrate 50. The linear actuators comprise a lead screw male part 62a, which cooperates with a lead screw female thread 42 integrated in the optical layer 40 for movement in either X and/or Y directions. Advantageously, the actuator 62 only pushes the optical layer 40 and a pre-constraint element, such as a spring, push it back against the actuator. It is possible to foresee a similar shifting mechanism to provide a translation in Z direction.

Figure 18:
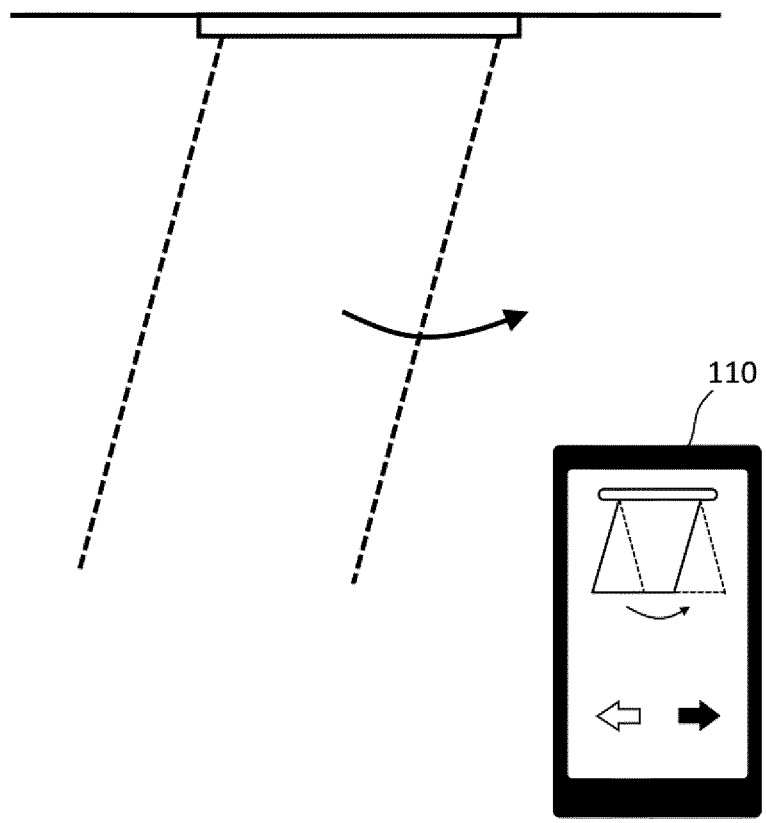
FIG. 18 is a schematic cross-sectional side view of the optomechanical system according to a fifteenth embodiment of the present invention.

As illustrated in FIG. 18, the optomechanical system can advantageously further comprise a control system 110 for the shifting mechanism 60, which can be based on different types of inputs/feedbacks:

Manual position adjustments with one or more control knobs or other mechanical input means. This embodiment is advantageous for applications where the luminaire output is adjusted occasionally and the luminaire is directly accessible/reachable by end users.

Commands sent to the control system by a software application 110, through a wired connection (e.g. USB) or wirelessly (e.g. through Bluetooth or Wi-Fi). This embodiment is advantageous for maximum flexibility and applications where direct user input is regularly required, such as office or retail lighting applications. Preferably, the commands can be sent using protocols such as DALI, DMX or KNX, to be compatible with existing luminaire installations and controllable by a centralized interface.

Autonomous, pre-programmed behavior based on a list of "scenes" or a preset trajectory depending on the time of the day, the date or other environmental parameters. This embodiment is advantageous for applications where little to no user input is expected, such as solar emulators.

Sensor output (e.g. IR sensors, CCD cameras, accelerometers, gyroscopes, wireless radios, etc.) providing information on the location, orientation or movement of people or objects, combined or not with technologies such as automatic image recognition software. This embodiment is useful for applications where the light output should automatically follow some people, objects or gestures, such as luminaires used in a medical environment.

In another embodiment of the present invention, there is no control system and the relative position of the light emitting substrate 50 and the optical layer 40 is adjusted during production and does not change during the lifetime of the product. In this embodiment, the luminaire itself is not dynamic, however the assembly process is. This embodiment is advantageous for applications where many different luminaire configurations are required in production, but once the luminaires are installed, their configuration is unlikely to change. Instead of requiring a different design of the optical layer 40 for each configuration (which requires a lot of inventory), the same optical layer 40 can be used for all configurations with a simple positioning adjustment during production.

Figure 19A:
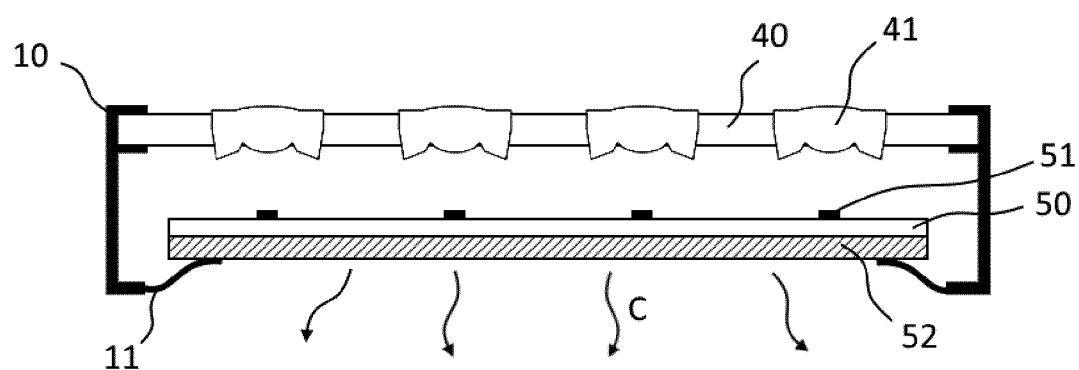
FIG. 19a is a schematic cross-sectional side view of the optomechanical system according to a sixteenth embodiment of the present invention where a flexible membrane is arranged between the bottom part of the static frame and the light emitting substrate.
Figure 19B:
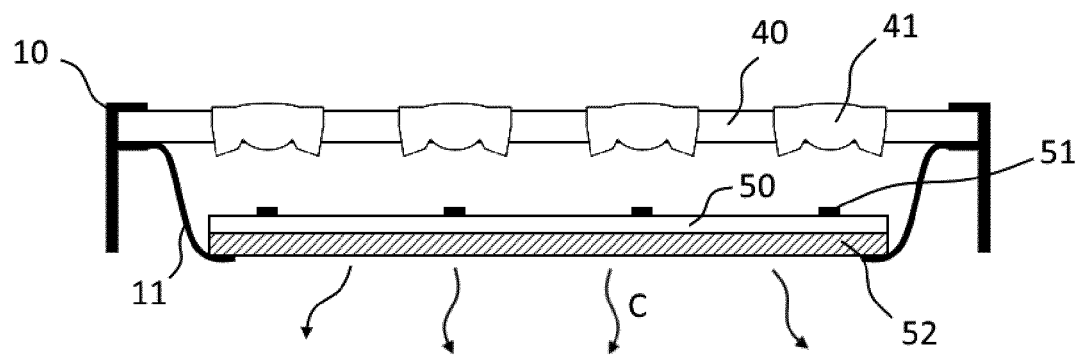
FIG. 19b is a schematic cross-sectional side view of the optomechanical system according to the sixteenth embodiment of the present invention where a flexible membrane is arranged between the top part of the static frame and the light emitting substrate.

FIGS. 19a and 19b display a nineteenth embodiment of the present invention, where at least a part 11 of the enclosure is made of a flexible material, preferably a membrane made of a rubber (such as EPDM or isoprene). More specifically, the flexible membrane 11 can be attached to the movable element (either the optical layer 40 or the light emitting substrate 50), enabling their movement while still providing a barrier to external contaminants. This embodiment is advantageous when some movable parts have to be exposed to the environment, for instance to improve heat dissipation by exposing the back side of the light emitting substrate 50 and the optional heat dissipation element 52 to ambient air (enabling or improving heat dissipation by convection, as schematically illustrated by the curved arrows C).

It is to be noted that the shape of the luminaire and its casing can be adapted to the requirements of the application. The form factor is preferably flat ("slim"), meaning that the thickness of the luminaire is much smaller than its width and length. The outline (as seen from above or below) can have for instance a square shape, a rectangular or elongated shape, a round or oval shape.

The invention claimed is:

1. An optomechanical system for dynamically controlling a photometric distribution of a luminaire comprising:
   a static frame,
   a light emitting substrate with one or more light emitting elements adapted to emit incident light,
   an optical layer comprising one or more optical elements adapted to capture incident light and to transmit transmitted light,
   a shifting mechanism adapted to translationally move along at least one direction a movable element which is chosen from either the optical layer or the light emitting substrate,
   wherein the shifting mechanism comprises one or more guiding elements arranged in a single planar module, one or more shifting elements, one or more position sensors and an electronic board, said one or more guiding elements being adapted to maintain an inclination angle between the light emitting substrate and the optical layer while moving the movable element, and
   wherein the optomechanical system is configured in such a way that a photometric distribution of the luminaire is dynamically controllable by adjusting a relative position of the one or more light emitting elements with respect to the one or more optical elements.

2. The optomechanical system according to claim 1, wherein the one or more guiding elements are arranged in such a way that a relative position of the optical layer and the light emitting substrate can be adjusted by said one or more shifting elements while specifically avoiding or minimizing relative rotations between the optical layer and the light emitting substrate.

3. The optomechanical system according to claim 2, wherein at least two of the one or more guiding elements and two said shifting elements are provided, said two shifting elements being arranged to shift the movable element along different directions.

4. The optomechanical system according to claim 1, wherein a distance between the light emitting substrate and the optical layer is controllable via a mechanical cam system comprising an inner shell and an outer shell, wherein the cam system is attached to a planar guiding module by means of the inner shell in such a way that a horizontal translation of the outer shell produces a horizontal translation of the optical layer, and a rotation of the outer shell, translates into a vertical translation of the optical layer.

5. An optomechanical system for dynamically controlling a photometric distribution of a luminaire comprising:

a static frame;
a light emitting substrate with one or more light emitting elements adapted to emit incident light;
an optical layer comprising one or more optical elements adapted to capture incident light and to transmit transmitted light; and
a shifting mechanism adapted to translationally move along at least one direction a movable element which is chosen from either the optical layer or the light emitting substrate,
wherein the shifting mechanism comprises one or more guiding elements, said one or more guiding elements being adapted to maintain an inclination angle between the light emitting substrate and the optical layer while moving the movable element,
wherein the optomechanical system is configured in such a way that a photometric distribution of the luminaire is dynamically controllable by adjusting a relative position of the one or more light emitting elements with respect to the one or more optical elements, and
wherein at least one of the one or more guiding elements is a flexible guiding elements integrated in the light emitting substrate.

6. The optomechanical system according to claim 4, wherein the planar guiding module is integrated into the light emitting substrate and is configured in such a way that the movement of the one or more light emitting elements relative to the one or more optical elements is dependent on the position of the one or more light emitting elements on the light emitting substrate.

7. An optomechanical system for dynamically controlling a photometric distribution of a luminaire comprising:
a static frame;
a light emitting substrate with one or more light emitting elements adapted to emit incident light;
an optical layer comprising one or more optical elements adapted to capture incident light and to transmit transmitted light;
a shifting mechanism adapted to translationally move along at least one direction a movable element which is chosen from either the optical layer or the light emitting substrate; and
one or more sliders arranged between the light emitting substrate and the optical layer, and one or more pre-constraining elements,
wherein the shifting mechanism comprises one or more guiding elements, said one or more guiding elements being adapted to maintain an inclination angle between the light emitting substrate and the optical layer while moving the movable element,
wherein the optomechanical system is configured in such a way that a photometric distribution of the luminaire is dynamically controllable by adjusting a relative position of the one or more light emitting elements with respect to the one or more optical elements.

8. The optomechanical system according to claim 7, wherein the sliders are integrated into the optical layer.

9. The optomechanical system according to claim 7, further comprising a sliding pad between a said slider and a surface it is sliding on.

10. The optomechanical system according to claim 7, wherein the one or more pre-constraining elements are flexible pre-constraining elements arranged between the light emitting substrate and the static frame.

11. The optomechanical system according to claim 1, wherein the light emitting substrate is directly attached to the optical layer by means of guiding elements selected from the group consisting of double cardan joints, double ball joints, linear guiding rails with carriage elements, leaf springs, cables, wires and ropes.

12. The optomechanical system according to claim 11, wherein the guiding elements are integrated into the optical layer.

13. The optomechanical system according to claim 2, wherein said one or more shifting elements comprise a lead screw that is at least partially positioned in the optical layer.

14. The optomechanical system according to claim 2, wherein said one or more shifting elements comprise a rack/pinion system comprising a rack element and a pinion element, wherein the pinion element is adapted to be manually or electromechanically rotated.

15. The optomechanical system according to claim 1, wherein static primary ones of said one or more optical elements are arranged directly onto the one or more light emitting elements.

16. The optomechanical system according to claim 1, wherein the static frame is at least partially open at its bottom and a flexible membrane seals a gap between the light emitting substrate and the static frame while allowing the light emitting substrate to move both laterally and vertically.

17. The optomechanical system according to claim 1, wherein the light emitting substrate comprises at least two different types of said one or more light emitting elements that differ in size, shape, spectra, collimation and/or intensity, at least one of said at least two different types of the one or more light emitting elements being formed as a continuous light emitting surface that is provided with holes in which another of the at least two different types of light emitting elements are placed.

18. The optomechanical system according to claim 1, wherein the light emitting substrate comprises at least two different types of said one or more light emitting elements that differ in size, shape, spectra, collimation and/or intensity, one said type of the one or more light emitting elements being placed on a partially cut or transparent front layer such that the light emitted by another said type of the one or more light emitting elements placed on a back layer is transmitted through the front layer towards the optical layer.

19. A method for dynamically controlling a photometric distribution of a luminaires with the optomechanical system according to claim 1, comprising:
capturing incident light and transmitting transmitted light,
moving either the optical layer or the light emitting substrate translationally relative to each other,
wherein the shifting mechanism moves the optical layer or the light emitting substrate translationally along at least one direction in such a way that a photometric distribution of the luminaire is controlled by adjusting the relative positions of the one or more light emitting elements relative to the one or more optical elements.

20. A luminaire comprising the optomechanical system according to claim 1.

* * * * *